United States Patent
Boudreau et al.

(10) Patent No.: US 12,004,069 B2
(45) Date of Patent: Jun. 4, 2024

(54) HYBRID QUANTIZE-FORWARD AND DECODE-FORWARD RELAYING TRANSMISSION FOR MASSIVE MIMO HetNets

(71) Applicant: Telefonaktiebolaget LM Ericsson (publ), Stockholm (SE)

(72) Inventors: Gary Boudreau, Kanata (CA); Ahmad Abu Al Haija, Toronto (CA); Min Dong, Whitby (CA); Ben Liang, Whitby (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 365 days.

(21) Appl. No.: 17/614,727

(22) PCT Filed: Jun. 19, 2019

(86) PCT No.: PCT/IB2019/055186
§ 371 (c)(1),
(2) Date: Nov. 29, 2021

(87) PCT Pub. No.: WO2020/254860
PCT Pub. Date: Dec. 24, 2020

(65) Prior Publication Data
US 2022/0248300 A1 Aug. 4, 2022

(51) Int. Cl.
*H04W 40/22* (2009.01)
*H04B 7/022* (2017.01)
(Continued)

(52) U.S. Cl.
CPC .......... *H04W 40/22* (2013.01); *H04B 7/0413* (2013.01); *H04B 7/15557* (2013.01)

(58) Field of Classification Search
CPC . H04W 40/22; H04B 7/0413; H04B 7/15557; H04B 7/022; H04B 7/15542
(Continued)

(56) References Cited

U.S. PATENT DOCUMENTS

2016/0128090 A1* 5/2016 Azarian Yazdi ...... H04L 1/1861

FOREIGN PATENT DOCUMENTS

WO 2019/083550 A1 5/2019

OTHER PUBLICATIONS

International Search Report and Written Opinion dated Feb. 24, 2020 issued in PCT Application No. PCT/IB2019/055186, consisting of 16 pages.
(Continued)

*Primary Examiner* — Inder P Mehra
(74) *Attorney, Agent, or Firm* — Weisberg I.P. Law, P.A.

(57) ABSTRACT

A method, network node and processor for processing uplink signals transmitted from a wireless device (WD) to provide a combination of quantize-forwarding and decode-forwarding relayed signals in massive multiple input multiple output (MIMO) heterogeneous networks (HetNets). According to one aspect, whether quantize-forwarding or decode-forwarding is used depends on a ratio of a quality of a WD signal received at a Small Cell Base Station (SCBS) to a quality of the WD signal received at a Macro Cell Base Station (MCBS). When the ratio is less than a first threshold, signals received at the SCBS may be quantize-forwarded to the MCBS and when the ratio exceeds a second threshold larger than the first threshold, signals received at the SCBS may be decode-forwarded to the MCBS. When the ratio lies between the first and second threshold, signals received at the SCBS may be quantize-forwarded to the MCB.

30 Claims, 11 Drawing Sheets

(51) Int. Cl.
*H04B 7/0413* (2017.01)
*H04B 7/155* (2006.01)

(58) Field of Classification Search
USPC .......................................................... 370/315
See application file for complete search history.

(56) References Cited

OTHER PUBLICATIONS

Kevin Luo et al.; Analysis of the Generalized DF-CF for Gaussian Relay Channels: Decode or Compress?, IEEE Transactions on Communications, vol. 61, No. 5, May 2013, consisting of 12 pages.
Zhengchuan Chen et al.; Cooperation in 5G Heterogeneous Networking: Relay Scheme Combination and Resource Allocation, IEEE Transaction on Communications, vol. 64, No. 8, Aug. 2016, consisting of 14 pages.
Samsung Electronics; DMC R&D Center; 5G Vision; Samsung White Paper, Feb. 2005, consisting of 16 pages.
Ericsson; 5G Radio Access; Ericsson White Paper, Apr. 2016, consisting of 10 pages.
Kanchel Loa et al., IMT-Advanced Relay Standards; WiMAX/LTE Update; IEEE Communications Magazine, vol. 48, No. 8, pp. 40-48, Aug. 2010, consisting of 9 pages.
Dinesh Bharadia et al.; Full Duplex Radios; ACM SIGCOMM Comput. Commun. Rev., vol. 43, No. 4, pp. 375-386, Oct. 2013, consisting of 9 pages.
Bertrand M. Hochwald et al.; Multiple-Antenna Channel Hardening and its Implications for Rate Feedback and Scheduling, IEEE Transactions on Information Theory, vol. 50, No. 9, pp. 1893-1909, Sep. 2004, consisting of 17 pages.

Emil Bjornson et al.; Massive MIMO: Ten Myths and One Critical Question, IEEE Communications Magazine, vol. 54, No. 2, pp. 114-123, Feb. 2016, consisting of 10 pages.
Claudio Rosa et al.; Dual Connectivity for LTE Small Cell Evolution: Functionality and Performance Aspects; IEEE Communications Magazine, vol. 54, No. 6, pp. 137-143, Jun. 2016, consisting of 7 pages.
Zhao-Yang Zhang et al.; Interference Coordination in Full-Duplex HetNet With Large-Scale Antenna Arrays; Frontiers of Information Technology & Electrical Engineering, vol. 18, No. 6, pp. 830-840, Jun. 2017, consisting of 11 pages.
Howard H. Yang et al.; Energy-Efficient Design of MIMO Heterogeneous Networks With Wireless Backhaul; IEEE Transactions on Wireless Communications, vol. 15, No. 7, Jul. 2016, consisting of 14 pages.
Mingjie Feng et al.; Joint Frame Design, Resource Allocation and User Association for Massive MIMO Heterogeneous Networks With Wireless Backhaul; IEEE Transactions on Wireless Communications, vol. 17, No. 3, Mar. 2018, consisting of 14 pages.
Gerhard Kramer et al.; Cooperative Strategies and Capacity Theorems for Relay Networks; IEEE Transactions on Information Theory, vol. 51, No. 9, Sep. 2005, consisting of 27 pages.
Bruce Anderson et al.; Descartes' Rules of Signs Revisited; The American Mathematical Monthly, vol. 105, No. 5, pp. 447-451, May 1998, consisting of 5 pages.
A. El Gamal et al.; Relay Channels; Network Information Theory, 1st ed. Cambridge University Press, 2011, consisting of 45 pages.
Hien Quoc Ngo et al.; Multipair Full-Duplex Relaying With Massive Arrays and Linear Processing; IEEE Journal on Selected Areas in Communications, vol. 32, No. 9, pp. 1721-1737, Sep. 2014, consisting of 17 pages.

\* cited by examiner

HYBRID QUANTIZE-FORWARD AND DECODE-FORWARD RELAYING TRANSMISSION FOR MASSIVE MIMO HetNets

CROSS-REFERENCE TO RELATED APPLICATIONS

This application is a Submission Under 35 U.S.C. § 371 for U.S. National Stage Patent Application of International Application Number: PCT/IB2019/055186, filed Jun. 19, 2019 entitled "HYBRID QUANTIZE-FORWARD AND DECODE-FORWARD RELAYING TRANSMISSION FOR MASSIVE MIMO HETNETS," the entirety of which is incorporated herein by reference.

TECHNICAL FIELD

This disclosure relates to wireless communication and in particular, to a hybrid method for quantize-forwarding and decode-forwarding relayed signals in massive multiple input multiple output (MIMO) heterogeneous networks (HetNets).

BACKGROUND

Compared to fourth generation (4G) networks, fifth generation (5G) cellular standards (also referred to as New Radio "NR") aim to improve the spectral efficiency by 3-10 times and data rates by 50 times to serve the escalating growth of connected devices. To achieve these goals, some enabling technologies include massive MIMO systems, HetNet with wireless backhaul and full-duplex transmission.

FIG. 1 shows a wireless network having a plurality of wireless devices WDs A-C, hereinafter referred to collectively as wireless devices (WDs) 8 lying within a small cell, wireless devices WD D and WD E lying outside the small cell but within a macro cell that encompasses at least part of the small cell, a small cell base station (SCBS) 5 and a macro cell base station (MCBS) 6. The MCBS 6 serves the macro cell that includes at least a part of the small cell served by the SCBS 5. In FIG. 1, the WDs 8, namely WDs A-C, transmit uplink signals to both the SCBS 5 and the MCBS 6. The SCBS 5 also transmits to the MCBS 6. In some implementations, both base stations 5 and 6 have a large number of antennas and deploy zero forcing (ZF) detection. The WDs A-C can send uplink signals to both the SCBS 5 and the MCBS 6. It will be clear to one having ordinary skill in the art that more or less than the number of wireless devices shown in FIG. 1 may be present in a wireless network and that more than the number of base stations shown in FIG. 1 may be present in the wireless network.

In 4G Long Term Evolution (LTE) systems, the relaying of signals from the SCBS 5 to the MCBS 6 is by half duplex mode while performing dual hop decode-forwarding, such that the SCBS 5 receives a message from a WD 8 in a first time slot and forwards the message to the MCBS 6 in a second time slot. Different WDs 8 transmit over different resource blocks so that there are no concurrent transmissions. Further, in some LTE implementations the WDs 8 transmit to the SCBS 5 and MCBS 6 at different frequencies.

In 5G New Radio (NR), small cells will be more widely deployed to improve network throughput. Such deployment will make wireless backhaul networks more cost-effective than wired backhaul to connect small cells and macro cells. 5G cellular networks will deploy frequency duplex (FD) radios since this can potentially double the spectral efficiency of the network. Furthermore, while self-interference is the main drawback of FD, much progress has been made in self-interference suppression by using different cancellation techniques, including passive suppression and analog and digital cancellation. Self-interference can be also cancelled with massive MIMO using ZF-based precoders. New Radio will also apply massive MIMO, where the base stations are equipped with a large number of antennas, which improves and simplifies the cellular transmission. Massive MIMO systems can 1) neglect small scale fading through channel hardening, 2) orthogonalize different user transmissions according to the law of large numbers (concurrent transmission is possible without inter-user interference) and 3) achieve optimal performance with a linear detector, e.g., a ZF detector. Specifically, by orthogonalizing different signals of WDs, the SCBS 5 can deploy different processing for each signal to maximize the transmission throughput.

SUMMARY

Some embodiments advantageously provide a method and system for quantize-forwarding and decode-forwarding relayed signals in massive multiple input multiple output (MIMO) heterogeneous networks (HetNets). Some embodiments utilize the following: massive MIMO, full duplex relaying and hybrid decode forwarding (DF) and quantize forwarding (QF) for different wireless devices based on their link qualities to the SCBS and MCBS. In this disclosure, it may be assumed that the number of antennas of the MCBS is M, the number of antennas of the SCBS is N, the number of WDs is K, and M>>N>>K.

The different forwarding for different WDs is feasible in massive MIMO systems because of the orthogonality of the WDs' data streams, which can be treated separately. Technical problems to be solved by some embodiments include determining an optimal choice between DF and QF relaying of the WD signal from the SCBS to the MCBS, determining an optimal resource allocation at the SCBS to maximize a weighted sum rate, and determining a transmission algorithm that has low complexity and achieves a large rate region.

Thus, some embodiments determine which WD signals will be relayed through QF relaying and which WD signals will be relayed through DF relaying. This is done by determining, for each WD signal, a ratio of the signal to noise ratio (SNR) (or other measure of signal strength or quality) of the WD signal at the SCBS to the SNR (or other corresponding measure of signal strength or quality) of the WD signal at the MCBS. Then the ratio of these measurements is compared to a first threshold. If the ratio falls below the first threshold, the signal of the WD is relayed through QF relaying. If the ratio exceeds the first threshold, then the remaining WDs are divided into two sets, where the WDs with higher ratio are relayed through DF relaying and the WDs with lower ratio are relayed through QF relaying. The optimal threshold to split these two sets may be found numerically via a linear search of no more than K iterations, where K may be a number of WDs in the small cell. This selection method is based on an assumption that as the relaying link (from the SCBS to the MCBS) becomes stronger than the direct link (from the WD to the MCBS), the DF relaying will outperform the QF relaying. Also, the selection method may be optimal in terms of the sum rate at high SNR.

Some embodiments determine optimal resource allocations at the SCBS that maximize the rate at which a weighted sum of WD signals are transmitted (the weighted sum rate). Specifically, for a given set of WDs with QF and DF relaying and a given set of weight factors for the WD transmission rates, the SCBS determines an optimal quantization for the WD signals relayed by QF and determines the optimal phase duration for the relayed WD signals. To achieve this resource allocation, a multiplicative water filling algorithm is employed. This may include expressing the optimization problem as a geometric programming (GP) problem and transforming the GP problem into a convex problem. Then, Karush-Kuhn-Tucker (KKT) conditions are applied to derive the water filling algorithm. To apply the water filling algorithm, the WDs are arranged based on their weighting factors and on their SNR ratios. Then, the maximum transmit rate of each WD is determined. Then, based on the optimal rate allocation for each WD's relayed signal, optimal phases are obtained as functions of the optimal rates.

Some embodiments employ a transmission scheme that relies on binning and time division techniques at the SCBS and a sequential sliding window decoding technique at the MCBS. In these embodiments, at the SCBS, binning techniques are applied and binning indices are found that include the quantization indices of the QF relayed WD signals and the decoded messages of the DF relayed WD signals. This may be done for each transmission block of a plurality of transmission blocks. Then, the j+1 transmission block may be divided into K time slots (phases) and the bin index may be transmitted for each WD's decoded or quantized signal in one slot. At the MCBS, separate and sequential sliding window decoding over two blocks (j and j+1) may be applied. To decode the signal from the $k^{th}$ WD sent in block j, first, the MCBS may apply zero forcing (ZF) detection to separate the data streams of the WDs and of the SCBS, as well as the signals in the j and j+1 blocks. Second, the bin index of the $k^{th}$ WD signal in the j+1 block may be decoded using the $k^{th}$ phase. The message of the WD signal may then be decoded directly if DF is employed and the quantization index of the WD signal may be decoded if QF is employed. Thus, the time division techniques at the SCBS allow separate decoding for each WD message while the binning technique allows sequential decoding of the bin index and then the WD message at the MCBS.

These methods may be simpler and more efficient than known techniques and scale linearly with the number of WDs, as compared with exponential scaling with known techniques. Further, by applying the hybrid DF and QF schemes, a larger rate region is obtained as compared to known techniques that apply DF for all WDs or QF for all WDs.

According to one aspect, a method for processing uplink signals transmitted from a wireless device, WD, to a small cell base station, SCBS, and from the SCBS to a macro cell base station, MCBS, the MCBS serving a macro cell that at least partially includes a small cell served by the SCBS is provided. The method includes, for each of a plurality of WDs served by the SCBS, determining a ratio of signal quality of a signal received from the WD at the SCBS to a signal quality of a signal received from the WD at the MCBS. The method includes comparing the determined ratio to a first threshold. When the ratio is less than the first threshold, the signal received at the SCBS is forwarded to the MCBS as a quantize-forward, QF, relay signal. When the determined ratio is greater than the first threshold, the ratio is compared to a second threshold greater than the first threshold. If the determined ratio is greater than the second threshold then the signal received at the SCBS is forwarded to the MCBS as a decode-forward, DF, relay signal. Otherwise, the signal received at the SCBS is forwarded to the MCBS as a QF relay signal. The DF relay signal may be based at least in part on a decoding of the signal received at the SCBS. The QF relay signal may be based at least in part on a quantization of the signal received at the SCBS.

According to this aspect, in some embodiments, the second threshold is determined based at least in part on a linear threshold search of no more than K iterations, where K is the number of the plurality of WDs served by the SCBS. In some embodiments, the second threshold is determined such that a number of WDs selected for DF relaying results in a maximum weighted sum rate of signals relayed from the SCBS to the MCBS. In some embodiments, the method further includes determining a quantization for each WD signal forwarded by QF relaying, the quantization being determined by a water-filling algorithm. In some embodiments, the method further includes determining a phase duration for each forwarded WD signal, the phase duration being determined by the water-filling algorithm. In some embodiments, the water-filling algorithm includes: prioritizing the WDs based at least in part on weighting factors and on the determined ratio for each WD; determining a maximum transmit rate for each WD in order of priority; and determining phases of the WDs as a function of their maximum transmit rates. In some embodiments, the forwarding is by a transmission process that includes binning the WD signals and transmitting binning indices that include quantization indices of QF relay signals and/or that correspond to decoded messages of the DF relay signals. In some embodiments, the transmission process includes applying separate sequential sliding window decoding over two sequential transmission blocks received at the MCBS. In some embodiments, the decoding at the MCBS includes decoding a signal from an nth WD sent in a first of the two transmission blocks by applying zero-forcing detection to separate data streams of the WDs and data streams of the SCBS. In some embodiments, the decoding at the MCBS further includes decoding a bin index of the nth WD signal in the second transmission block using an nth phase and further decoding a message of the nth WD signal based at least in part on the bin index.

According to another aspect, a network node processes uplink signals from a wireless device, WD, to an SCBS, and from the SCBS to a MCBS, where the MCBS serves a macro cell that at least partially includes a small cell served by the SCBS. The network node includes processing circuitry configured to, for each of a plurality of WDs served by the SCBS: determine a ratio of signal quality of a signal received from the WD at the SCBS to signal quality of a signal received from the WD at the MCBS. The processing circuitry is further configured to compare the determined ratio to a first threshold. When the ratio is less than the first threshold, the signal received at the SCBS is forwarded to the MCBS as a quantize-forward, QF, relay signal. When the ratio is greater than the first threshold, the determined ratio is compared to a second threshold greater than the first threshold. If the determined ratio is greater than the second threshold, the signal received at the SCBS is forwarded to the MCBS as a decode-forward, DF, relay signal. Otherwise, the signal received at the SCBS is forwarded to the MCBS as a QF relay signal.

According to this aspect, in some embodiments, the second threshold is determined based at least in part on a linear threshold search of no more than K iterations, where K is the number of the plurality of WDs served by the SCBS. In some embodiments, the second threshold is determined such that a number of WDs selected for DF relaying results in a maximum weighted sum rate of signals relayed from the SCBS to the MCBS. In some embodiments, the processing circuitry is further configured to determine a quantization for each WD signal forwarded by QF relaying, the quantization being determined by a water-filling algorithm. In some embodiments, the processing circuitry is further configured to determine a phase duration for each forwarded WD signal, the phase duration being determined by the water-filling algorithm. In some embodiments, the water-filling algorithm includes: prioritizing the WDs based at least in part on weighting factors and on the determined ratio for each WD; determining a maximum transmit rate for each WD in order of priority; and determining phases of the WDs as a function of their maximum transmit rates. In some embodiments, the forwarding is by a transmission scheme that includes binning the WD signals and transmitting binning indices that include quantization indices of QF relay signals and/or that correspond to decoded messages of the DF relay signals. In some embodiments, the transmission scheme includes applying separate sequential sliding window decoding over two sequential transmission blocks at the MCBS. In some embodiments, the decoding at the MCBS includes decoding a signal from an nth WD sent in a first of the two transmission blocks by applying zero-forcing detection to separate data streams of the WDs and data streams of the SCBS. In some embodiments, the decoding at the MCBS further includes decoding a bin index of the nth WD signal in the second transmission block using an nth phase and further decoding a message of the nth WD signal based at least in part on the bin index.

According to yet another aspect, a processor for processing uplink signals from a wireless device, WD, to a small cell base station, SCBS, and from the SCBS to a macro cell base station, MCBS, the MCBS serving a macro cell that at least partially includes a small cell served by the SCBS is provided. The processor includes a ratio determiner configured to receive or determine a ratio of a signal quality of a signal received from the WD at the SCBS to a signal quality of a signal received from the WD at the MCBS. The processor further includes a first comparator 26 configured to compare the ratio to a first threshold. The processor also includes a second comparator configured to compare the ratio to a second threshold. A signal forwarder configured to forward the signal received at the SCBS to the MCBS as a quantize-forward, QF, relay signal when the ratio is less than the first threshold, as a QF relay signal when the ratio is greater than the first threshold but less than the second threshold, and as a decode-forward, DF, relay signal when the ratio is greater than the second threshold.

According to this aspect, in some embodiments, the second threshold is determined based at least in part on a linear threshold search of no more than K iterations, where K is a number of a plurality of WDs served by the SCBS. In some embodiments, the second threshold is determined such that a number of WDs selected for DF relaying results in a maximum weighted sum rate of signals relayed from the SCBS to the MCBS. In some embodiments, the processor further includes a quantizer configured to determine a quantization for each WD signal forwarded by QF relaying, the quantization being determined by the quantizer using a water-filling algorithm. In some embodiments, the processor further includes a phase duration determiner to determine a phase duration for each forwarded WD signal, the phase duration being determined by the phase duration determiner using the water-filling algorithm. In some embodiments, the water-filling algorithm includes: prioritizing the WDs based at least in part on weighting factors and on the determined ratio for each WD; determining a maximum transmit rate for each WD in order of priority; and determining phases of the WDs as a function of their maximum transmit rates. In some embodiments, the forwarding is by a transmission scheme that includes binning the WD signals and transmitting binning indices that include quantization indices of QF relay signals and/or that correspond to decoded messages of the DF relay signals. In some embodiments, the transmission scheme includes applying separate sequential sliding window decoding over two sequential transmission blocks at the MCBS. In some embodiments, the decoding at the MCBS includes decoding a signal from an nth WD sent in a first of the two transmission blocks by applying zero-forcing detection to separate data streams of the WDs and data streams of the SCBS. In some embodiments, the decoding at the MCBS further includes decoding a bin index of the nth WD signal in the second transmission block using an nth phase and further decoding a message of the nth WD signal based at least in part on the bin index.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
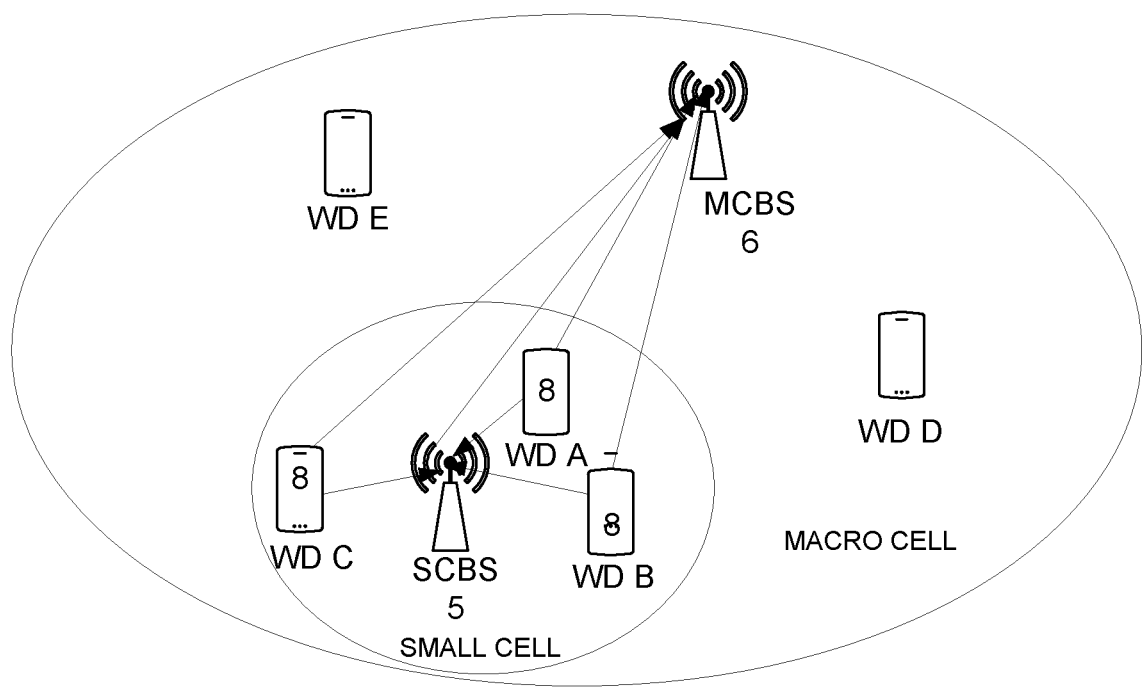
FIG. 1 illustrates a small cell within a macro cell.

Before describing in detail exemplary embodiments, it is noted that the embodiments reside primarily in combinations of apparatus components and processing steps related to a hybrid method for quantize-forwarding and decode-forwarding relayed signals in massive MIMO heterogeneous networks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

In this disclosure, an "indication" generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

The term signal used herein can be any physical signal or physical channel. Examples of physical signals are reference signals such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH etc. These terms/abbreviations may be used according to 3GPP standard language, in particular according to LTE or NR.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB/gNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB/gNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP and/or LTE/NR technologies.

Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Also note that terminology such as eNodeB/gNodeB and wireless device should be considered non-limiting and does in particular not imply a certain hierarchical relation between the two; in general "eNodeB" could be considered as device 1 and "wireless device" device 2, and these two devices communicate with each other over some radio channel. Also, while the disclosure focuses on wireless transmissions in the downlink, embodiments are equally applicable in the uplink.

The term "wireless device" used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, a sensor equipped with WD, PDA, iPAD, Tablet, mobile terminals, smart phone, laptop embedded equipped (LEE), laptop mounted equipment (LME), USB dongles, computer premises equipment (CPE), etc.

The term "network node" used herein may refer to a radio network node or another network node, e.g., a core network node, MSC, MME, O&M, OSS, SON, positioning node (e.g. E-SMLC), MDT node, etc.

The term "network node" or "radio network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS) etc. The network node may also comprise test equipment. The term "radio node" used herein may be used to also denote a wireless device such as a WD or a radio network node.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Before describing in detail exemplary embodiments, it is noted that the embodiments reside primarily in combinations of apparatus components and processing steps related to adaptation between synchronous and asynchronous operations in a wireless network based on numerology. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, a hybrid method for quantize-forwarding and decode-forwarding relayed signals in massive multiple input multiple output (MIMO) heterogeneous networks (HetNets) is provided.

Channel Model

Figure 2:
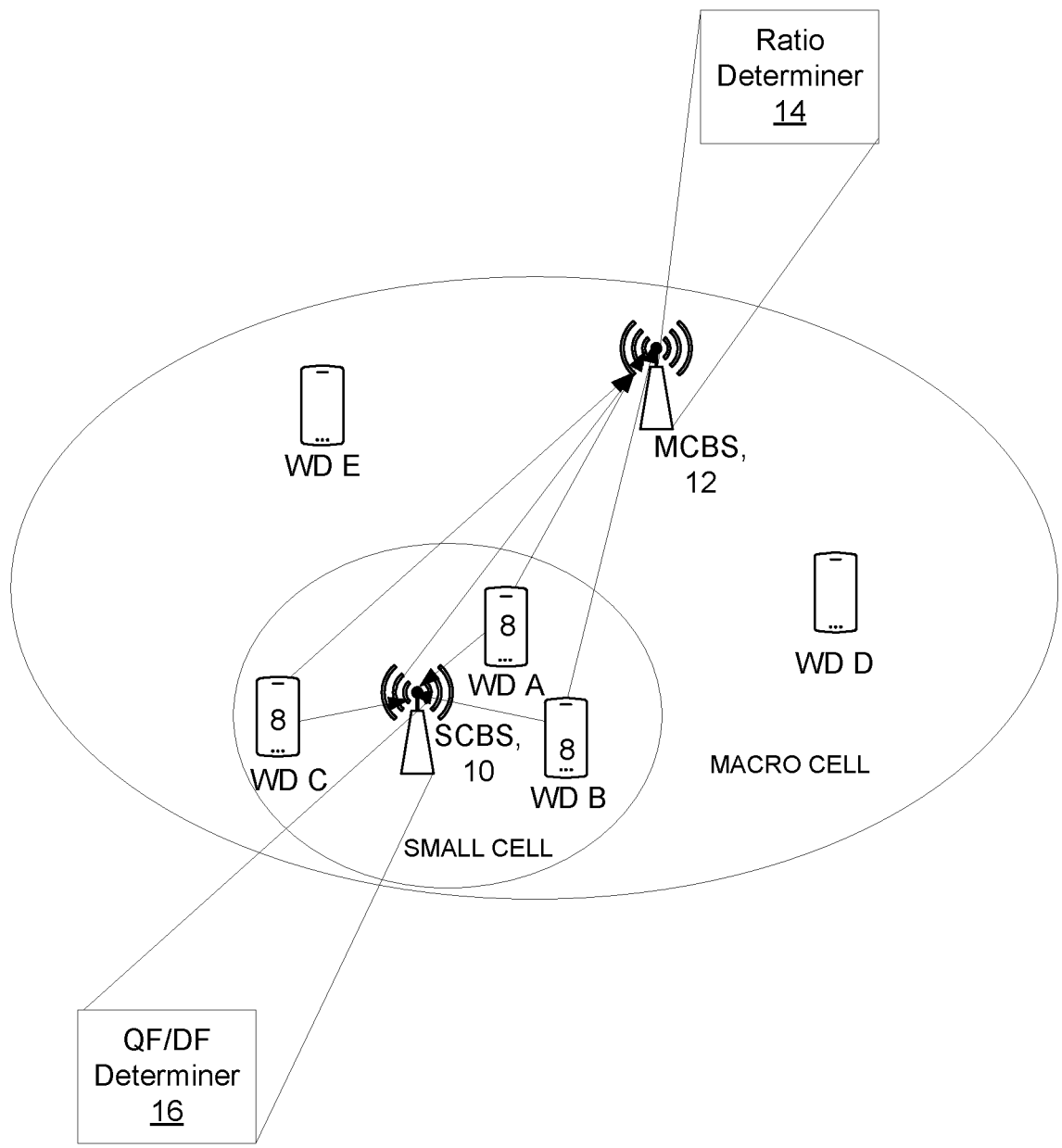
FIG. 2 illustrates a small cell within a macro cell that implements a hybrid method for quantize-forwarding and decode-forwarding relayed signals.

Consider uplink transmission in a HetNet that consists of a macro cell, a small cell and K WDs as shown in FIG. 2. FIG. 2 is a block diagram of a wireless network having an SCBS 10 and an MCBS 12 constructed according to principles discussed herein. Each WD may have a single antenna, the SCBS has N antennas and the MCBS has M antennas, where M>>N>>K. Since using massive MIMO techniques at both MCBS and SCBS can reduce the uplink interference from other nodes to a negligible level, transmissions in and from other SCBSs in the same macro cell may be ignored.

As shown in FIG. 2, an SCBS 10 may receive uplink signals from a plurality of WDs 8 (WDs A-C) in a small cell. The MCBS 12 may receive uplink signals directly from the WDs 8 and may also receive uplink signals from the SCBS 10 that are based on signals received by the SCBS 10 from the WDs 8. In some embodiments, the MCBS 12 has a ratio determiner 14 to determine, for each wireless device, a ratio of its signal quality at the SCBS 10 to its signal quality at the MCBS 12. This ratio is compared, via the QF/DF determiner 16, to a threshold to determine whether to perform decode-forward (DF) relaying or quantize-forward (QF) relaying at the MCBS 12. If the ratio is large enough, indicating that processing gains can be achieved by DF relaying over QF relaying, then the SCBS 10 uses DF relaying to transfer data to the MCBS 12. Note that the ratio determiner 14 and the QF/DF determiner 16 may both be located in one location in an alternative embodiment.

Thus, the WDs 8 may communicate with the MCBS 12 through the SCBS 10, as shown in FIG. 2. This uplink channel resembles the multiple-access relay channel (MARC) shown in FIG. 3, where the SCBS 10 resembles the relay (R) and the MCBS 12 resembles the destination (D).

Figure 3:
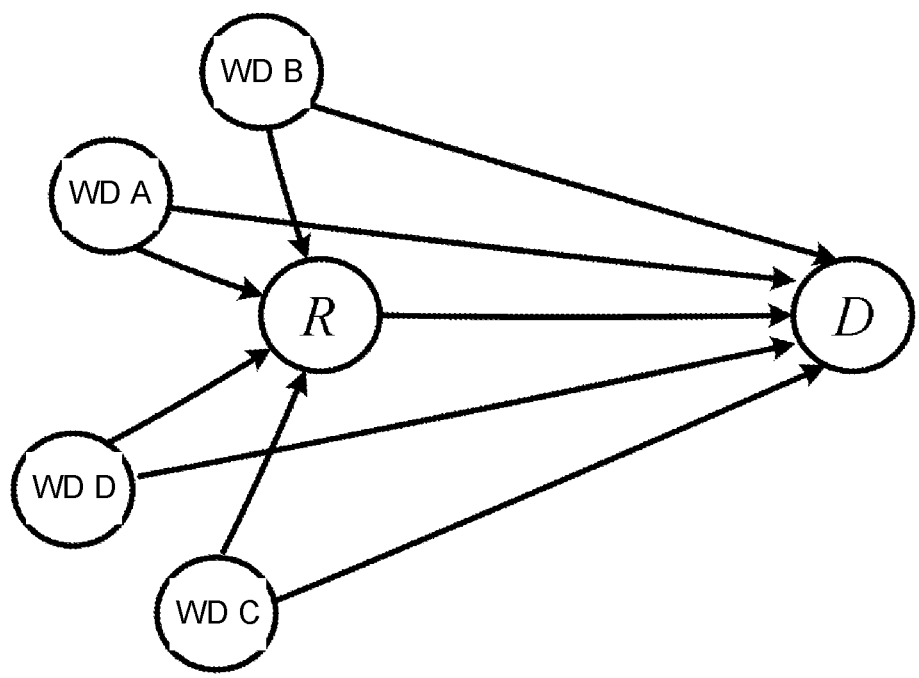
FIG. 3 illustrates a multiple access relay channel (MARC)

For the MARC in FIG. 3, assume a block fading channel model where the channel over each link remains constant in each transmission block and changes independently between blocks. Over B transmission blocks (B>>1), let $$h_{rk,j} = [h_{rk,j}^{(1)}, h_{rk,j}^{(2)}, \ldots h_{rk,j}^{(N)}]^T$$

where $h_{rk,j}$ is the N×1 channel vector from $WD_k$ to R in block j for k∈{1, 2, ..., K} and $$j \in \{1, 2, \ldots, B\}$$

and where $h_{rk,j}^{(n)}$ is the channel coefficient from $WD_k$ to the $n^{th}$ antenna of R in block j. Assume that $h_{rk,j}^{(n)}$ is a complex Gaussian vector with zero mean and covariance. $\sigma_{h,r}^2 I$ The variance is based on the path loss model where $\sigma_{h,r}^2 = d_{rk}^\alpha$ is the distance between $WD_k$ and R and α is the path loss exponent. A similar definition holds for the M×1 channel vector $h_{dk,j}$ from $WD_k$ to D and the M×N channel matrix $H_{dr,j}$ from R to D. Assume that all channel coefficients are independent of each other. At any transmission block j∈{1, 2, ..., B}, given $h_{rk,j}$, $h_{dk,j}$, and $H_{dr,j}$, the received signal vectors at R and D, denoted by $y_{r,j}$ and $y_{d,j}$ respectively, are given as follows:

$$y_{r,j} = \sum_{k=1}^{K} h_{rk,j} x_{k,j} + z_{r,j}, \quad y_{d,j} = \sum_{k=1}^{K} h_{dk,j} x_{k,j} + H_{dr,j} x_{r,j} + z_{d,j}, \quad (1)$$

where $x_{k,j}$ is the signal transmitted by $WD_k$ while $x_{r,j}$ is the N×1 transmit vector from R; $z_{r,j}$ and $z_{d,j}$ are N×1 and M×1 independent complex additive white Gaussian noise (AWGN) with zero mean and covariance $I_N$ and $I_M$, respectively.

Assume that the full channel coefficients are known at the respective receivers (R;D), i.e., R knows $h_{rk,j}$ while D knows $h_{dk,j}$ and $H_{dr,j}$. Moreover, R knows (via feedback from D) the variance of the channel from R to D, and from each WD to D, through the path loss information. Such knowledge helps R optimize its transmission for maximum rate region. Note that the path loss information over each link is much easier to obtain than the massive MIMO channel itself ($h_{dk}$ and $H_{dr}$) in each block.

Consider full-duplex relaying at the SCBS (R). Although full-duplex relaying suffers from self-interference, it can be substantially alleviated by analog and digital cancellation techniques and the remaining part appears as an additional additive noise. Hence, assume perfect cancellation at the SCBSs in this model. In massive MIMO systems, linear Hybrid DF-QF Transmission Algorithm The transmission scheme is based on:
1) ZF detection at the SCBS 10 and the MCBS 12;
2) QF relaying for some WDs 8 and DF relaying for the other WDs 8 at the SCBS 10 in addition to binning encoding and time division transmission for each WDs 8 data stream; and
3) Sliding window decoding at the MCBS 12 with separate decoding for each WD's message and sequential decoding for the binning indices and then the WD's message.

In the scheme described herein, each WD 8 aims to send B−1 messages over B transmission blocks. Table I helps describe the transmission scheme as it shows the encoding and decoding for the two-WD scenario.

TABLE I

Encoding and decoding for the Hybrid DF-QF scheme in the HetNet uplink transmission.

| | | Block number | | | | | |
|---|---|---|---|---|---|---|---|
| | | j | | j + 10 | | j + 2 | |
| | | Time slots (durations) | | | | | |
| | | $\beta_1$ | $\beta_2$ | $\beta_1$ | $\beta_2$ | $\beta_1$ | $\beta_2$ |
| | UE1 | $x_1(w_{1,j})$ | | $x_1(w_{1,j+1})$ | | $x_1(w_{1,j+2})$ | |
| | UE2 | $x_2(w_{2,j})$ | | $x_2(w_{2,j+1})$ | | $x_2(w_{2,j+2})$ | |
| Small cell | Rx1 | $\tilde{y}_{r1,j} \to \hat{w}_{r1,j} \to b_{1,j}$ | | $\tilde{y}_{r1,j+1} \to \hat{w}_{r1,j+1} \to b_{1,j+1}$ | | $\tilde{y}_{r1,j+2} \to \hat{w}_{r1,j+2} \to b_{1,j+2}$ | |
| | Rx2 | $\tilde{y}_{r2,j} \to \hat{y}_{r2,j} \to l_{2,j} \to b_{2,j}$ | | $\tilde{y}_{r2,j+1} \to \hat{y}_{r2,j+1} \to l_{2,j+1} \to b_{2,j+1}$ | | $\tilde{y}_{r2,j+2} \to \hat{y}_{r2,j+2} \to l_{2,j+2} \to b_{2,j+2}$ | |
| | Tx | $x_{r1}(b_{1,j-1})$ | $x_{r2}(b_{2,j-1})$ | $x_{r1}(b_{1,j})$ | $x_{r2}(b_{2,j})$ | $x_{r1}(b_{1,j+1})$ | $x_{r2}(b_{2,j+1})$ |
| Macro cell | Rx1 | $\tilde{y}_{d1,j}$ | | $\tilde{y}_{d1,j+1}$ | | $\tilde{y}_{d1,j+2}$ | |
| | Rx2 | $\tilde{y}_{d2,j}$ | | $\tilde{y}_{d2,j+1}$ | | $\tilde{y}_{d2,j+2}$ | |
| | Rxr | $\tilde{y}_{dr1,j}$ | $\tilde{y}_{dr2,j}$ | $\tilde{y}_{dr1,j+1}$ | $\tilde{y}_{dr2,j+1}$ | $\tilde{y}_{dr1,j+2}$ | $\tilde{y}_{dr2,j+2}$ |
| | Decoding | $(\hat{w}_{1,j-1})$ | $(\hat{w}_{2,j-1})$ | $(\hat{w}_{1,j})$ | $(\hat{w}_{2,j})$ | $(\hat{w}_{1,j+1})$ | $(\hat{w}_{2,j+1})$ | detectors like ZF or maximum ratio combining (MRC) are applied to reduce the inter-user interference. Here, the ZF detector is chosen for simplicity, but similar analysis is applicable to other detectors. Receivers at R and D may apply ZF detection to separate the data streams from different origins. Specifically, define the ZF matrices $A_{r,j}$ and $A_{d,j}$ as follows:

$$A_{r,j} = (G_{r,j}^H G_{r,j})^{-1} G_{r,j}^H, \quad A_{d,j} = (G_{d,j}^H G_{d,j})^{-1} G_{d,j}^H,$$

where $$G_{r,j} = [h_{r1,j} h_{r2,j} \ldots h_{rK,j}], \quad G_{d,j} = [h_{d1,j} h_{d2,j} \ldots h_{dK,j} H_{dr,j}], \quad (2)$$

Denote $A_{r,j} = [a_{r1,j} a_{r2,j} \ldots a_{rK,j}]^H$, $A_{d,j} = [a_{d1,j} a_{d2,j} \ldots a_{dK,j} A_{dr,j}]^H$ where $a_{rk,j}$ is an N×1 vector, $a_{di,j}$ is an M×1 vector and $A_{dr,j}$ is an M×N matrix. After applying ZF matrices in (2) to the received signal vectors $y_{r,j}$ and $y_{d,j}$ at R and D) in (1) respectively, yields the K×1 received vector $\tilde{y}_{r,j}$ at R and (K+N)×1 received vector $\tilde{y}_{d,j}$ at D as follows:

$$\tilde{y}_{r,j} = [\tilde{y}_{r1,j} \; \tilde{y}_{r2,j} \; \ldots \; \tilde{y}_{rK,j}]^T, \quad (3)$$

$$\tilde{y}_{d,j} = [\tilde{y}_{d1,j} \; \tilde{y}_{d2,j} \; \ldots \; \tilde{y}_{dK,j} \; \tilde{y}_{dr,j}]^T,$$

$$\tilde{y}_{rk,j} = x_{k,j} + a_{rk,j}^H z_{r,j}, \quad \tilde{y}_{dk,j} = x_{k,j} + a_{dk,j}^H z_{d,j},$$

$$\tilde{y}_{dr,j} = x_{r,j} + A_{dr,j}^H z_{d,j},$$

where $\tilde{y}_{rk,j}$ (respectively, $\tilde{y}_{dk,j}$) is the data stream received at R (resp. D) from $WD_k$ in block j and $\tilde{y}_{dr,j}$ is the N×1 signal vector received at D from R in block j.

Generally, in block j, the transmission and decoding at each node is given as follows:
1) Each WD 8 transmits a new message to the SCBS 10 and the MCBS 12, i.e, $WD_k$ sends its new message ($w_{k,j}$) as follows:

$$x_{k,j} = \sqrt{P_k} \, U_k(w_{k,j}),$$

where $P_k$ is the transmit power of $WD_k$ and $U_k$ is a Gaussian signal with zero mean and unit variance that conveys the codeword of $w_{k,j}$.

2) The SCBS 10: deploys ZF detection, DF relaying for some WDs 8, QF relaying for the other WDs 8, binning and time division transmission. Define G(DF) (or respectively, G(QF)) as the group of WDs 8 that will be relayed through DF (resp. QF) relaying at the SCBS 10. Then, the relaying process at the SCBS 10 may be given as follows:

First, the SCBS 10 deploys ZF detection to separate the data streams from each WD 8 and obtain $\tilde{y}_{rk,j}$ as in (3).

Second, the SCBS 10 deploys DF relaying for some WDs 8 and QF relaying for the other WDs 8. On one hand, if k∈G(DF), the SCBS 10 decodes the $WD_k$ message at the following rate:

$$R_k \leq \log\left(1 + \frac{P_k N}{d_{rk}^\alpha}\right) = I_{1,k} \quad (4)$$

On the other hand, if k∈G(QF), the SCBS will first quantize $\tilde{y}_{rk,j}$ where the output of the quantizer is given as follows:

$$\hat{y}_{rk,j} = \tilde{y}_{rk,j} + \hat{z}_{rk,j}, \quad (5)$$

where $\hat{y}_{rk,j}$ is the quantized version of $\tilde{y}_{rk,j}$ and $\hat{z}_{rk,j}$ is the quantization noise with zero mean and $Q_k$ variance. Then, the SCBS 10 finds the corresponding quantization indices ($l_{k,j}$). Such a quantization index exists if its rate $R_{qk}$ satisfies the following constraint:

$$R_{qk} \geq \log\left(1 + \frac{d_{rk}^\alpha / N + P_k}{Q_k}\right) = I_{qk} \quad (6)$$

Third, the SCBS 10 deploys a binning technique and finds the bin index ($b_{k,j}$) for 1) the decoded message of the WD 8 with DF relaying and 2) the quantization index for the WD 8 with QF relaying. After finding the bin indices for all WDs 8, the SCBS 10 transmits these binning indices in block j+1 in K separate phases of durations $\beta_1, \beta_2, \ldots,$ and $\beta_K$ where the sum of these phases is equal to 1. Therefore, in block j+1, the SCBS 10 generates its forwarding signals as follows:

Phase k: $x_{rk,j} = \sqrt{P_r/N} U_{rk}(b_{k,j})$, where $P_r$ is the transmit power of the SCBS 10, $U_{rk}(b_{k,j})$ is an N×1 Gaussian random vector with zero mean and covariance $I_N$ which conveys the code word of the binning index $b_{k,j}$.

3) The MCBS 12: deploys ZF detection, separate and sequential sliding window decoding by utilizing the received signals from the SCBS 10 in block j+1 and the WDs 8 in block j as follows.

First, the SCBS 10 deploys ZF detection to separate the data streams from each WD 8 and the SCBS 10 to obtain $\tilde{y}_{dk,j}$ and $\hat{y}_{dr,j+1}$ as in (3). However, after ZF detection, as the SCBS 10 transmits in multiple phases, the received signals from the SCBS 10 over K phases in block j+1 are given by Phase k $$\tilde{y}_{drk,j+1} = x_{rk,j+1} + A_{dr,j+1}^H z_{d,j+1} \quad (7)$$

For the WDs 8 with DF relaying, the decoding is the same for each WD message. Similarly, the same decoding is employed for all WDs 8 with QF relaying. The decoding is the same for each WD message with DF relaying. Hence, the decoding for one WD 8 with DF relaying and for one WD 8 with QF relaying is explained.

On one hand, for a WD 8 that was relayed by DF, i.e., k∈G(DF), the MCBS 12 utilizes $\tilde{y}_{drk,j+1}$ in (7) and $\tilde{y}_{dk,j}$ in (3) to sequentially decode:

The bin index $\hat{b}_{k,j}$ using $\tilde{y}_{drk,j+1}$. Reliable decoding is ensured if the bin index rate $R_{b1}$ satisfies the following constraint:

$$R_{bk} \leq \beta_k N \log\left[1 + \frac{P_r(M-N)}{N d_{dr}^\alpha}\right]. \quad (8)$$

The $WD_k$ message $\hat{w}_{k,j}$ using $\tilde{y}_{dk,j}$ given that $\hat{w}_{k,j} \in \hat{b}_{k,j}$. Reliable decoding is ensured if $$R_k - R_{bk} \leq \log\left[1 + \frac{P_k(M-N)}{d_{dk}^\alpha}\right]. \quad (9)$$

On the other hand, for a WD 8 that was relayed by QF, i.e., k∈G(QF), the MCBS 12 utilizes $\tilde{y}_{dk,j}$ in (7) and $\tilde{y}_{drk,j+1}$ in (3) to sequentially decode:

The bin index $\hat{b}_{k,j}$ using $\tilde{y}_{drk,j+1}$ in an identical way to the WD 8 with DF relaying and reliable decoding is ensured if the bin index rate $R_{b1}$ satisfies (8).

The quantization index $\hat{I}_{k,j}$ using $\tilde{y}_{dk,j}$ given that $\hat{I}_{k,j} \in \hat{b}_{k,j}$. Reliable decoding is ensured if $$R_{qk} - R_{bk} \leq \log[\upsilon] - \log[\upsilon - P_k^2], \quad (10)$$

where $\upsilon = \left(\frac{N d_{dk}^\alpha}{M-N} + P_k\right)\left(\frac{d_{rk}^\alpha}{N} + Q_k + P_k\right).$ Note that the constraint is on $R_{qk}-R_{bk}$ instead of $R_{qk}$ as the MCBS 12 may only look for $\hat{I}_{k,j}$ such that $\hat{I}_{k,j} \in \hat{b}_{k,j}$ The $WD_k$ message $\hat{w}_{k,j}$ uses $\tilde{y}_{dk,j}$ in (3) and $\hat{y}_{rk,j}(\hat{I}_{k,j})$ in (5). Reliable decoding is ensured if the message transmission rate Rk satisfies $$R_k \leq \log\left[1 + \frac{P_k(M-N)}{d_{dk}^\alpha} + \frac{P_k}{(d_{rk}^\alpha / N) + Q_k}\right]. \quad (11)$$

Figure 4:
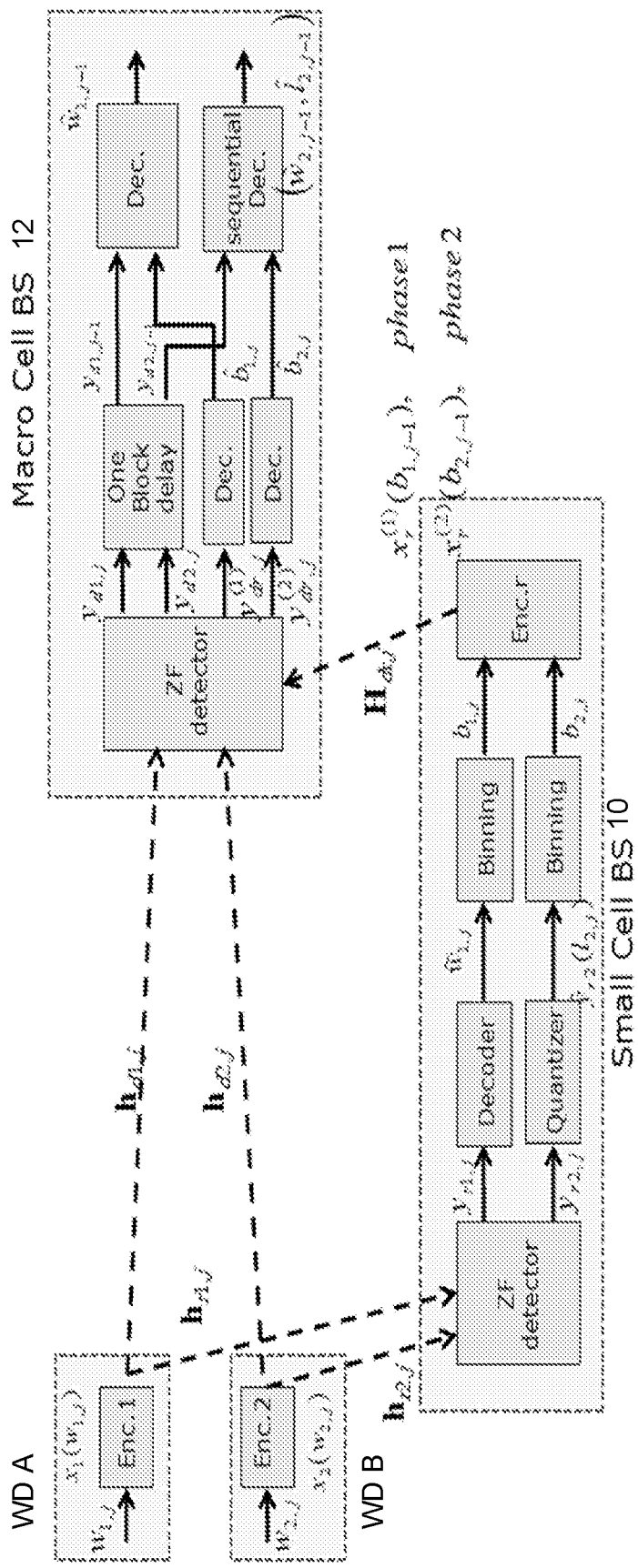
FIG. 4 is a block diagram for transmission by two wireless devices (WDs)
Figure 5:
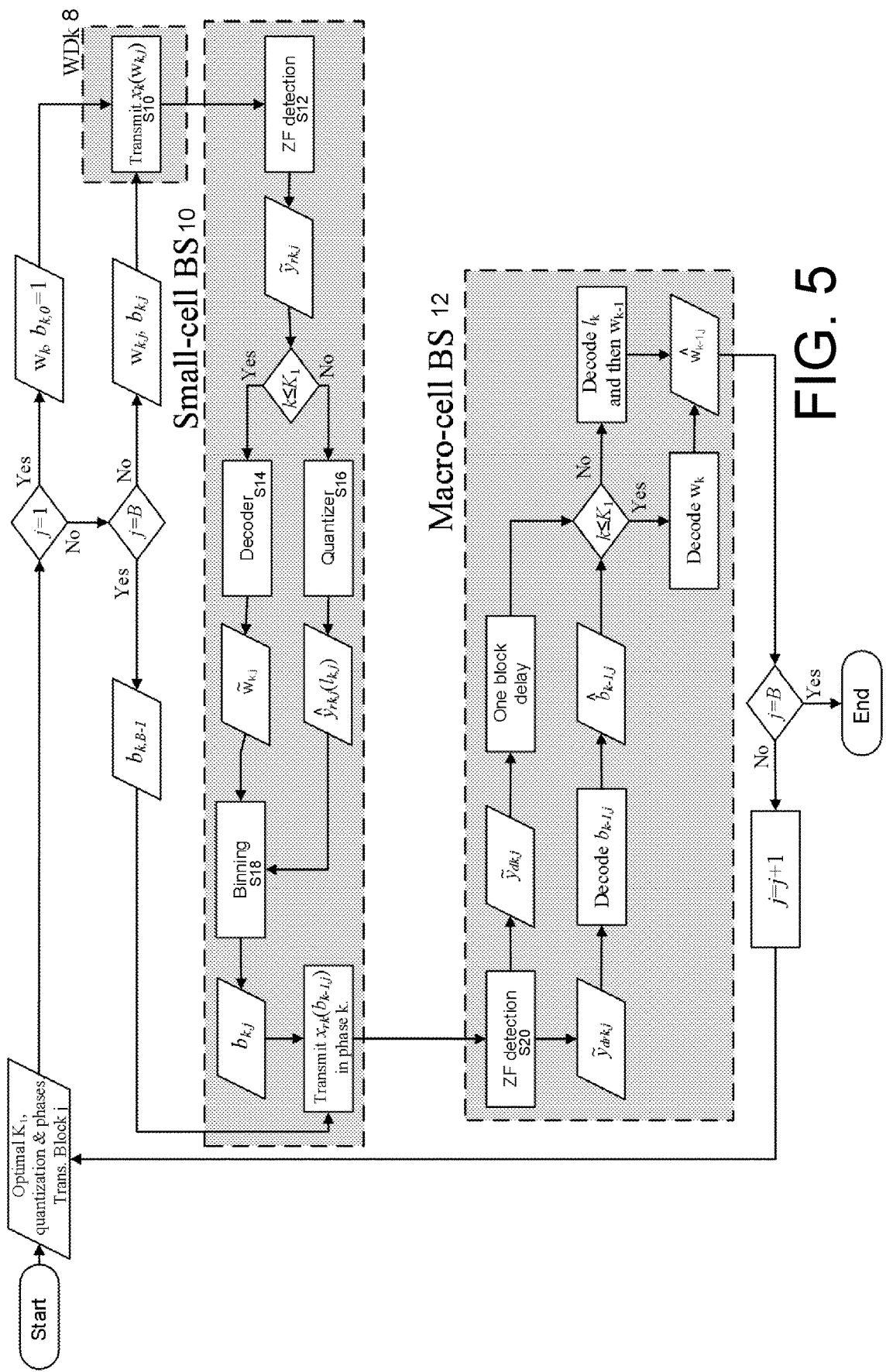
FIG. 5 is a flowchart of an exemplary process of a transmission algorithm.

The transmission scheme can be clarified further with the help of FIGS. 4 and 5. FIG. 4 shows the block diagram for the transmission of two WDs 8 and the encoding and decoding process at each node where the SCBS 10 deploys DF relaying for WD A and QF relaying for WD B. FIG. 5 illustrates a flowchart of an embodiment of a herein-described transmission algorithm, showing transmission by the $WD_k$ 8 (Block S10), and ZF Detection (Block S12) by the SCBS 10. Note that the SCBS 10 deploys DF relaying (Block S14) for the first K1 WDs 8 and QF relaying (Block S16) for the remaining WDs 8, and then employs binning (Block S18) of the decoded/quantized signals. FIG. 5 shows the MCBS 12 using ZF detection (Block S20) to detect a signal transmitted from the SCBS 10, the signal being decoded by the MCBS 12 according to whether it was QF relayed or DF relayed by the SCBS 10.

Let $R_k$ denote the transmission rate for $WD_k$ for k∈{1, 2, ..., K}. The achievable rate region is determined by the rate constraints that ensure reliable decoding at the MCBS 12. Consider the hybrid DF-QF scheme where DF relaying is deployed for the first $K_1$ WDs 8 ($K_1 < K$) and QF relaying for the remaining WDs 8. Then, the achievable rate region is given in the following Theorem:

Theorem 1: For K-WD massive MIMO HetNet, the achievable rate region of the Hybrid DF-QF scheme consists of all K-tuple rate vectors ($R_1, R_2, \ldots R_K$) satisfying $$R_k \leq \quad (12)$$

$$\begin{cases} \min\{I_{k1}, I_{k2}\} & k \in \{1, 2, \ldots, K_1\}, \quad G(DF) \\ I_{k3}, \quad \text{s.t.} \, Q_k \geq Q_k^t & k \in \{K_1+1, K_1+2, \ldots, K\} \quad G(QF) \end{cases}$$

where

-continued $$I_{k1} = \log\left[1 + \frac{P_k N}{d_{rk}^\alpha}\right],$$

$$I_{k2} = \log\left[1 + \frac{P_k(M-N)}{d_{dk}^\alpha}\right] + \beta_k \log(\lambda_s),$$

$$\lambda_s = \left(1 + \frac{P_r(M-N)}{d_{dr}^\alpha}\right)^N, \quad Q_k^t = \frac{d_{rk}^\alpha/N(1 + P_k(M-N)/d_{dk}^\alpha) + P_k}{(1 + P_k(M-N)/d_{dk}^\alpha)(\lambda_s^{\beta_k} - 1)},$$

$$I_{k3} = \log\left[1 + \frac{P_k(M-N)}{d_{dk}^\alpha} + \frac{P_k}{(d_{rk}^\alpha/N) + Q_k}\right], \quad \sum_{k=1}^{K} \beta_k = 1.$$

Proof: $I_{k1}$ is obtained from (4); $I_{k2}$ is obtained by combining (8) and (9); $I_{k3}$ is obtained form (11); and the condition $Q_k \geq Q'_k$ is obtained by combining (6), (8), and (10).

Remark 1: Theorem 1 shows that the rate region consists of individual rate constraints from different WDs 8, which stems from the orthogonality property of massive MIMO and the time division transmission by the SCBS 10. However, despite the separate individual rate constraints, optimizing the relaying at the SCBS 10 can be done jointly among the WDs 8 as they share the same link from the SCBS 10 to the MCBS 12. The optimal relaying at the SCBS 10 is discussed below.

Figure 6:
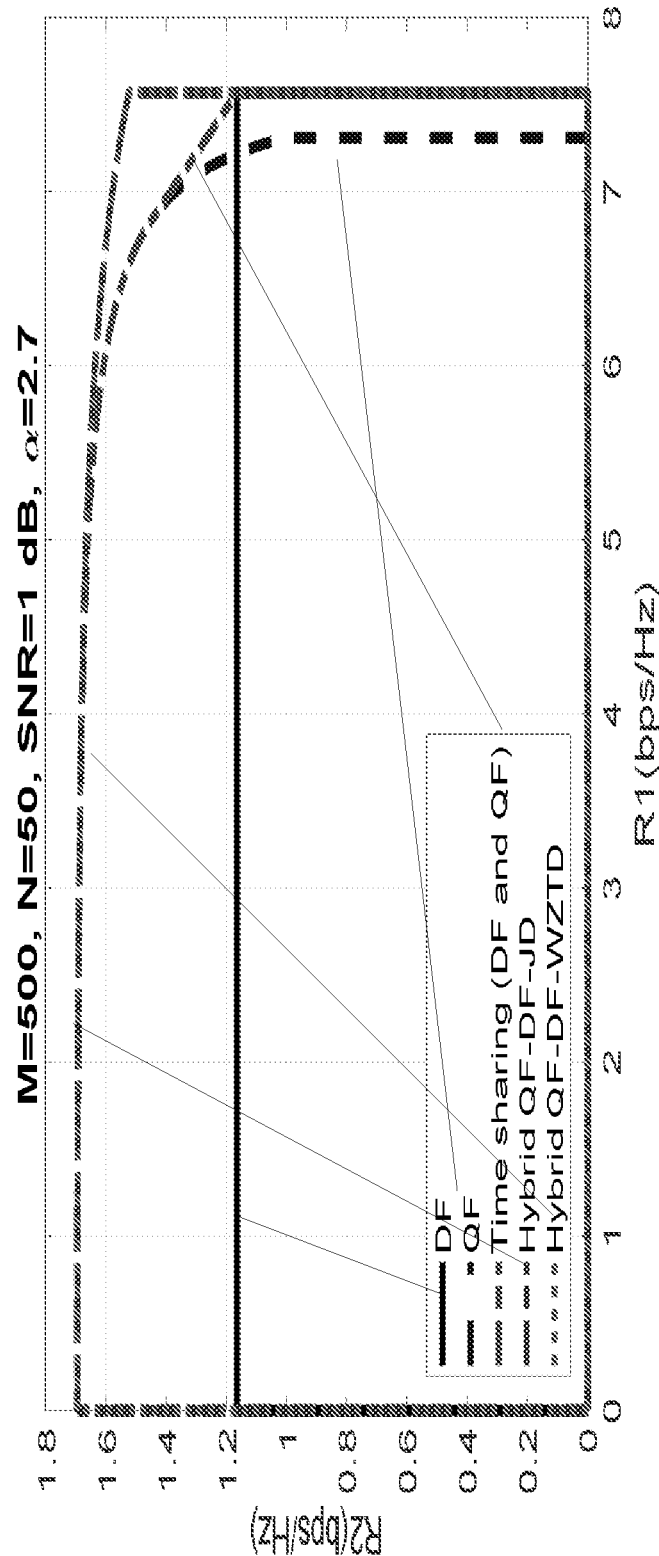
FIG. 6 compares the rate regions of two WDs for a hybrid DF-QF scheme.

FIG. 6 compares the rate regions of two WDs 8 for the hybrid DF-QF scheme with previous schemes that deploy QF or DF relaying for both WDs 8. In this figure, both WDs 8 transmit the same power $P_1=P_2$ while $P_r=5P_1$. The SCBS 10 has 50 antennas and the MCBS 12 has 500 antennas. The inter-node distances in meters are: $d_{d1}=105$; $d_{d2}=110$; $d_{dr}=100$; $d_{r1}=7$; and $d_{r2}=45$. The path loss fading is determined by a path loss exponent $\alpha=2.7$. The results show that the hybrid DF-QF scheme outperforms the sole deployment of DF or QF schemes and even their time-shared region. The SCBS 10 may deploy DF relaying for a first WD that is very close to the SCBS 10 while deploying QF relaying for a second WD that is far from the SCBS 10.

Moreover, another hybrid DF-QF scheme is plotted in which the SCBS 10 transmits a common code word for the decoded message of the first WD and the quantization index of the second WD while the MCBS 12 deploys joint decoding for both WDs' messages. Hence, there is no binning, time division or separate and sequential decoding as in the schemes described herein. Despite that this second scheme is more complex because of common transmission and joint decoding; it achieves the same rate region of the simpler scheme, which is discussed below.

Besides the achievable rate region, the complexity of the schemes described herein may be considered for practical implementation. The complexity of the hybrid DF-QF scheme described herein may be measured in terms of the codebook size for the transmitted signals at the SCBS 10 and the decoding complexity at the MCBS 12. Let n be the length of the transmitted code words. Then, the codebook size and decoding complexity are given as follows:

The codebook size for the SCBS 10's transmitted signals:
The SCBS 10 separately transmits the binning indices for the decoded messages for WDs 8 in G(DF) and quantization indices for WDs 8 in G(QF). Hence, the total number of separate codewords is:

$$\sum_{k=1}^{K} 2^{nR_{bk}},$$

where $R_{bk}$ is the transmission rate for the binning index of $WD_k$.

The decoding complexity at the MCBS 12 may be defined as follows:

Considering an ML decoding, define the decoding complexity as the number of likelihoods calculated to estimate the transmitted messages, which are given as follows.

For each $WD_k$ in G(DF), the MCBS 12 sequentially decodes 1) the bin index, and then 2) the WD message within the decoded bin index, by calculating $2^{nR_{bk}}$ and $2^{n(R_k-R_{bk})}$ likelihoods, respectively.

For each $WD_k$ in G(QF), the MCBS 12 sequentially decodes the 1) bin index, 2) quantization index within the decoded bin index, and then 3) WD message, by calculating $2^{nR_{bk}}$, $2^{n(R_{qk}-R_{bk})}$ and $2^{nR_k}$, likelihoods respectively.

Therefore, considering that the DF relaying is deployed for WDs 8 with $k \in \{1, 2, \ldots, K_1\}$ and QF relaying is deployed for WDs 8 with $k \in \{K_1+1, K_1+2, \ldots, K\}$, the total likelihoods for calculation are:

$$\sum_{k=1}^{K_1} (2^{nR_{bk}} + 2^{n(R_k-R_{bk})}) + \sum_{k=K_1+1}^{K} \left(2^{nR_{bk}} + 2^{n(R_{qk}-R_{bk})} + 2^{nR_k}\right)$$

Based on the above complexity analysis, the following remark can be made.

Remark 2: The complexity of the hybrid DF-QF increases linearly with the number of WDs 8.

Corollary 1 (Hybrid scheme with joint decoding): The hybrid scheme with joint decoding can also be deployed with common transmission at the SCBS 10 for the decoded messages and quantization indices and with joint decoding for all the WDs 8' messages. However, this scheme requires higher complexity while still achieving the same performance of the scheme presented herein, i.e., the hybrid scheme without joint decoding but with separate and sequential decoding. Specifically, the complexity of the joint decoding scheme increases exponentially with the number of WDs 8.

Proof: In the hybrid scheme with joint decoding, the SCBS 10 transmits a common codeword for the decoded messages and quantization indices. Hence, the codebook size iS:

$$2^{n\left(\sum_{k=1}^{K_1} R_k + \sum_{k=K_1+1}^{K} R_{qk}\right)}$$

Moreover, the MCBS 12 jointly decodes all WDs 8 messages. Hence, the total number of likelihood calculation is:

$$2^{n\left(\sum_{k=1}^{K_1} R_k + \sum_{k=K_1+1}^{K} R_{qk}\right)}$$

Finally, following similar analysis, it can be shown that both the joint decoding scheme and the separate and sequential scheme achieve the same rate region.

Optimal Resource Allocation for Maximum Weighted Sum Rate

For practical implementation, it may be useful to determine the optimal resource allocations that achieve the boundary of the achievable rate region. For the considered hybrid DF-QF scheme for massive MIMO HetNet, the SCBS 10 may optimize the phase durations for relaying all WD data in addition to the quantization for WDs' data streams that are relayed through QF relaying.

In Theorem 1, any boundary point of the rate region can be represented by the weighted sum rate $$\sum_{k=1}^{K} \mu_k$$

$R_k$ where $\mu_k \in [0, 1]$ is some priority weighting factor of $WD_k$ rate, while $$\sum_{k=1}^{K} \mu_k = 1.$$

Since the SCBS 10 deploys DF relaying for the first $K_1$ WDs 8 and QF relaying for the other WDs 8, the rate region boundary is achieved by maximizing the weighted sum rate for some given $\mu_1, \mu_2, \ldots,$ and $\mu_K$ over $\beta_1, \beta_2, \ldots,$ and $\beta_K$ and $Q_{K1+1}, Q_{K1+2}, \ldots,$ and $Q_K$. Considering the rate region in Theorem 1, the optimization problem is formulated as follows:

$$\max_{Q_k, \beta_l, \beta_k} \sum_{k=1}^{K_1} \mu_k \min\{I_{k1}, I_{k2}\} + \sum_{k=K_1+1}^{K} \mu_k I_{k3}, \quad (13)$$

s.t. $Q_k \geq Q_k^t$, for $k \in \{K_1 + 1, K_1 + 1, \ldots K\}$, where $I_{k1}$, $I_{k2}$ and $I_{k3}$ are given in (12).

The optimization problem in (13) is solved as follows. First, define the SNR at the MCBS 12 and that at the SCBS 10, respectively as follows:

$$a_k = P_k(M - N)/d_{dk}^\alpha, \quad b_k = P_k N / d_{rk}^\alpha \quad (14)$$

Let $\lambda_k^* = (\lambda_s)^{\beta_k^*}$ for $k \in \{1, 2, \ldots, K\}$.
Then, since $\lambda_s > 1$ in (13):

$$\lambda_k^* \geq 1, \quad \prod_{k=1}^{K} \lambda_k^* = \lambda_s \quad \beta_k^* = \frac{\log(\lambda_k^*)}{\log(\lambda_s)}, \quad (15)$$

Second, for the QF relaying rates, note that $I_{k3}$ is decreasing with $Q_k$. Hence, $I_{k3}$ is maximized at the minimum value of Qk, i.e., $$Q_k^* = Q_k^{t*} = \frac{d_{rk}^\alpha / N(1 + P_k(M - N)/d_{dk}^\alpha) + P_k}{(1 + P_k(M - N)/d_{dk}^\alpha)(\lambda_k^* - 1)}. \quad (16)$$

By substituting Q in (16) into $I_{k3}$ in (13), $I_{k3}$ becomes as follows:

$$I_{k3} = \log[1 + a_k] + \log[1 + a_k + b_k] - \log\left[1 + a_k + \frac{b_k}{\lambda_k}\right], \quad (17)$$

where $a_k$ and $b_k$ are given in (14).

Third, for the DF relaying rates ($I_{k1}$, $I_{k2}$), note that $I_{k1}$ is independent of the phase duration. Hence, the DF rate can be re-expressed as follows:

$$I_{k2} = \log[1 + a_k] + \beta_k N \log\left(1 + \frac{P_r(M - N)}{N d_{dr}^\alpha}\right) = \log[1 + a_k] - N\log\left(\frac{1}{\lambda_k}\right), \quad (18)$$

s.t. $1 \leq \lambda_k \leq \frac{1 + b_k}{1 + a_k}$.

Note that the upper bound on $\lambda_k$ ensures that $I_{k2} \leq I_{k1}$.

Fourth, considering (17) and (18), the optimization problem in (13) becomes a Geometric programming (GP) problem as follows:

$$\min_{\lambda_k} \sum_{k=1}^{K_1} \mu_k \ln\left(\frac{1}{\lambda_k}\right) + \sum_{k=K_1+1}^{K} \mu_k \ln\left(1 + a_k + \frac{b_k}{\lambda_k}\right), \quad (19)$$

s.t.

$$\lambda_s^{-1} \prod_{k=1}^{K} \lambda_k = 1,$$

$$\lambda_k^{-1} \leq 1, k \in \{K_1 + 1, K_1 + 2, \ldots K\},$$

$$\lambda_k^{-1} \leq 1, \frac{1 + a_k}{1 + b_k} \lambda_k \leq 1, k \in \{1, 2, \ldots K_1\}.$$

Fifth, transform (19) to a convex optimization problem by setting $\delta_k = \ln(\lambda_k)$.

Last, by applying the KKT conditions, the following multiplicative water-filling algorithm is obtained.

Figure 7:
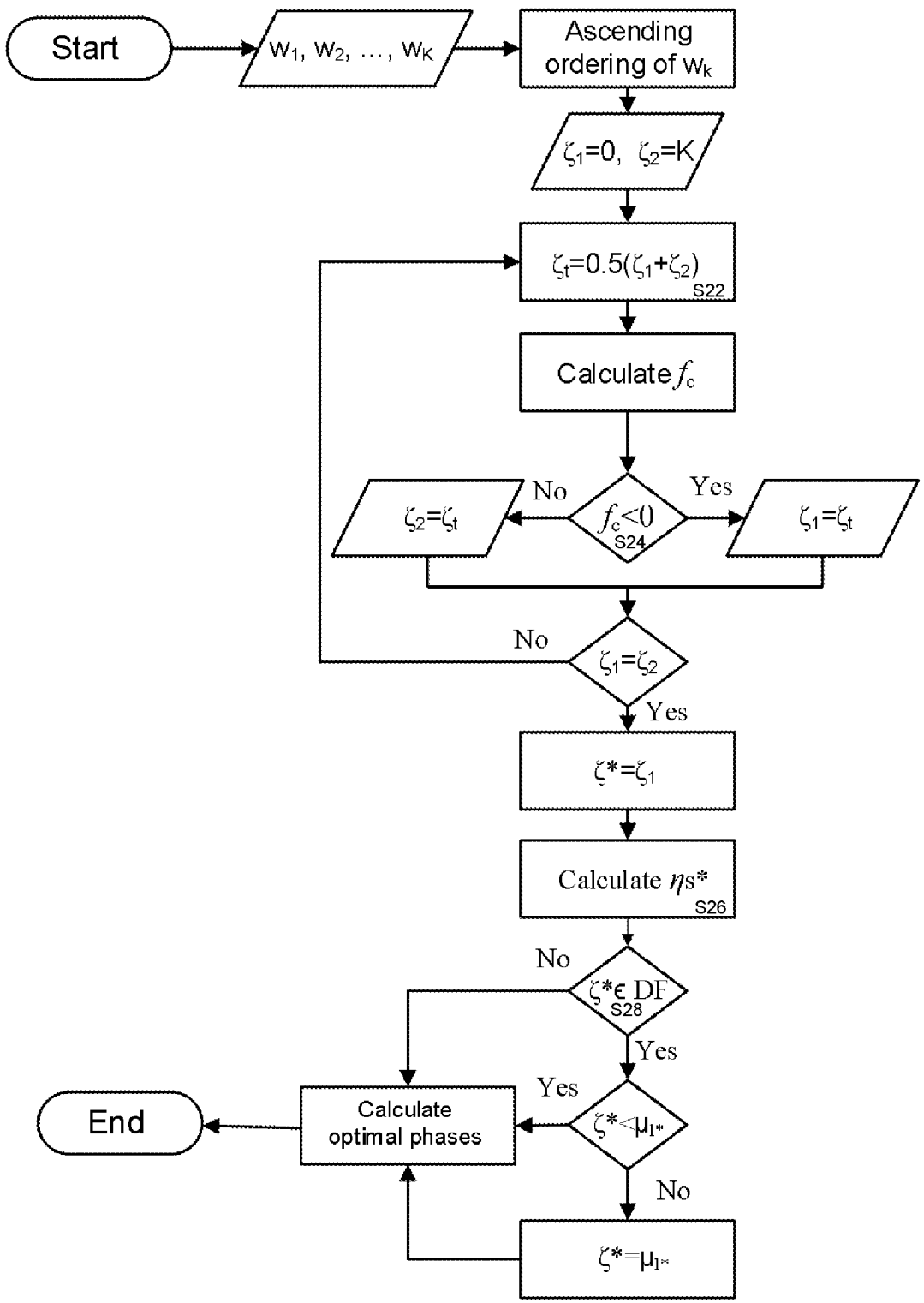
FIG. 7 is flowchart of an exemplary process for a water-filling algorithm.

A flow chart of this water-filling algorithm is shown in FIG. 7. Consider the total rate from the SCBS 10 to the MCBS 12. The SCBS 10 aims to optimally distribute this rate among the WDs' relayed signals (bin indices) such that the weighted sum rate is maximized.

Regarding the water-levels (maximum rate) of each WD 8:

For WDs 8 with DF relaying, the water level is determined by the SNRs (without loss of generality, SNR can be replaced by or be considered with signal to interference plus noise ratio (SINR) or signal to leakage plus noise ratio (SLNR)) at the MCBS 12 and the SCBS 10 for each WD 8 separately. Furthermore, the weighting factors help determine the ordering of the WD 8, i.e., which WDs 8 the SCBS 10 should serve first.

For WDs 8 with QF relaying, the water level and the ordering of the WDs 8, as well as their weighting factors, are determined by the SNRs at the MCBS 12 and the SCBS 10. Furthermore, the water-level is determined jointly among the WDs 8 with the help of Descartes' rule of signs.

The following Algorithm provides the optimal solution for problem (19) and summarizes the flowchart shown in FIG. 7.

---

Algorithm 2: Maximizing the weighted sum rate of the hybrid DF-QF scheme in Massive MINO HetNet.
Input: M, N, $P_r$, $P_k$, $d_{rk}$, $d_{dk}$, $d_{dr}$, and $\mu_k$, $k \in \{1, 2, \ldots, K\}$, and $K_1$,
Group of DF WDs (G(DF)): DF relaying for WDs $k \in \{1, 2, \ldots, K_1\}$,
Group of QF WDs (G(QF)): QF relaying for WDs
$k \in \{K_1 + 1, K_1 + 2, \ldots, K\}$,
Output: 1) Optimal phase durations at the SCBS 10 for all WDs, and their transmission rates for the binning indices ($R_{bk}$). 2) optimal -continued quantization noise variances $Q_k^*$ for WDs with QF relaying, and the transmission rates for the quantization indices ($R_{qk}$).
Definitions:

$$a_k = P_1(M-N)/d_{d1}^\alpha, \; b_k = P_k N/d_{rk}^\alpha,$$

$$\lambda_s = \left(1 + \frac{P_r(M-N)}{Nd_{dr}^\alpha}\right)^N, \; \lambda_k = \lambda_s^{\beta_k}, \; \prod_{k=1}^{K}\lambda_k = \lambda_s \; \delta_k = \ln(\lambda_k)$$

$$w_k = \begin{cases} \dfrac{1}{\mu_k}, & k \in \{1, 2, \ldots, K_1\} \\ \dfrac{1+a_k+b_k}{\mu_k b_k}, & k \in \{K_1+1, K_1+2, \ldots, K\} \end{cases}$$

1) Arrange $w_k$ in ascending order. Without loss of generality, assume that $w_1 \leq w_2 \leq \ldots \leq w_K$
2) Find the maximum $k^*$ such that $f_c < 0$ where $$f_c = \prod_{k=1}^{k^*}\left(w_{k^*} - \frac{1}{\mu_k}\right) - \lambda_s \prod_{k=1}^{k^*}\left(\frac{1+a_k}{\mu_k + b_k}\right).$$

Note, bisection method can be used as shown in FIG. 7. (Block S22)
3) After finding $k^*$, find the positive real root for $f(x_s) = 0$ where $$f(x_s) = \prod_{k=1}^{k^*}\left(x_s + w_{k^*} - \frac{1}{\mu_k}\right) - \lambda_s \prod_{k=1}^{k^*}\left(\frac{1+a_k}{\mu_k b_k}\right)$$

Note that $f(x_s)$ has one positive real root only if $f_c < 0$ (Block S24) according to Descartes' rule of sign.
4) Calculate $\eta_s^*$ (Block S26) as follows $$\eta_s^* = \begin{cases} (x_s + w_{k^*})^{-1} & k^* \in G(QF) \\ \min\{u_{k^*}, (x_s + w_{k^*})^{-1}\} & k^* \in G(DF) \end{cases}$$

5) Then, obtain $\delta_k^*$ for WDs with QF relaying as follows:

$$\delta_k^* = \begin{cases} \ln\left(\dfrac{\mu_k b_k}{1+a_k}\left(\dfrac{1}{\eta_s^*} - \dfrac{1}{\mu_k}\right)\right) & k \leq k^* \\ 0, & k > k^* \end{cases},$$

6) Similarly, obtain $\delta_k^*$ for WDs with DF relaying as follows

If $k* \in G(QF)$, $\delta_k^* = \begin{cases} \ln\left(\dfrac{1+b_k}{1+a_k}\right) & k < k^* \\ 0, & k > k^* \end{cases}$ However, if $k^* \in G(DF)$ (Block S28), $$\delta_k^* = \begin{cases} \ln\left(\dfrac{1+b_k}{1+a_k}\right), & k \leq k^* - 1 \\ \ln\left(\dfrac{1+b_k}{1+a_k}\right), & k = k^*, \; \mu_{k^*} > \eta_s^* \\ \ln(\lambda_s) - \displaystyle\sum_{k=K_1+1}^{k^*}, & k = k^*, \; \mu_{k^*} = \eta_s^* \\ \ln\left(\dfrac{\mu_k b_k}{a_k}\left(\dfrac{1}{\eta_s^*} - \dfrac{1}{\mu_k}\right)\right) - \displaystyle\sum_{l=1}^{l^*-1}\delta_l \\ 0, & k > k^* \end{cases}$$

7) Obtain $$\lambda_k^* = \exp(\delta_k^*), \; \beta_k^* = \frac{\log(\lambda_k^*)}{\log(\lambda_s)}$$

Then, obtain 1) $Q_k^*$ as in formula (16), 2) $R_k^*$ as in formulas (17) and (18), 3) $R_{bk}$ as in formula (8), and 4) $R_{qk}$ as from formual (10) or (6).
End Remark 3: Algorithm 3 includes individual rate maximization and equal sum rate maximization as special cases;
Individual rate: the individual rate of $WD_k$ may be maximized by setting $\mu_i=1$ and the remaining $\mu_k=0$ for all $k \neq i$.
Equal sum rate maximization (throughput) in Algorithm 2: the throughput maximization may be obtained by setting $\mu_k=1/K$ for all $k\in\{1, 2, \ldots, K\}$.

Remark 4: Moreover, steps 5 and 6 in Algorithm 3 help determine the last WD 8 that will be served by the SCBS 10 that won't be relaying the WDs 8 for $k>k^*$. The messages of these WDs 8 will be decoded at the MCBS 12 through their direct links only. This is equivalent to the water filling idea that no resources will be allocated to the WD with weak links to the SCBS 10 or with very low weighting factor.

Figure 8:
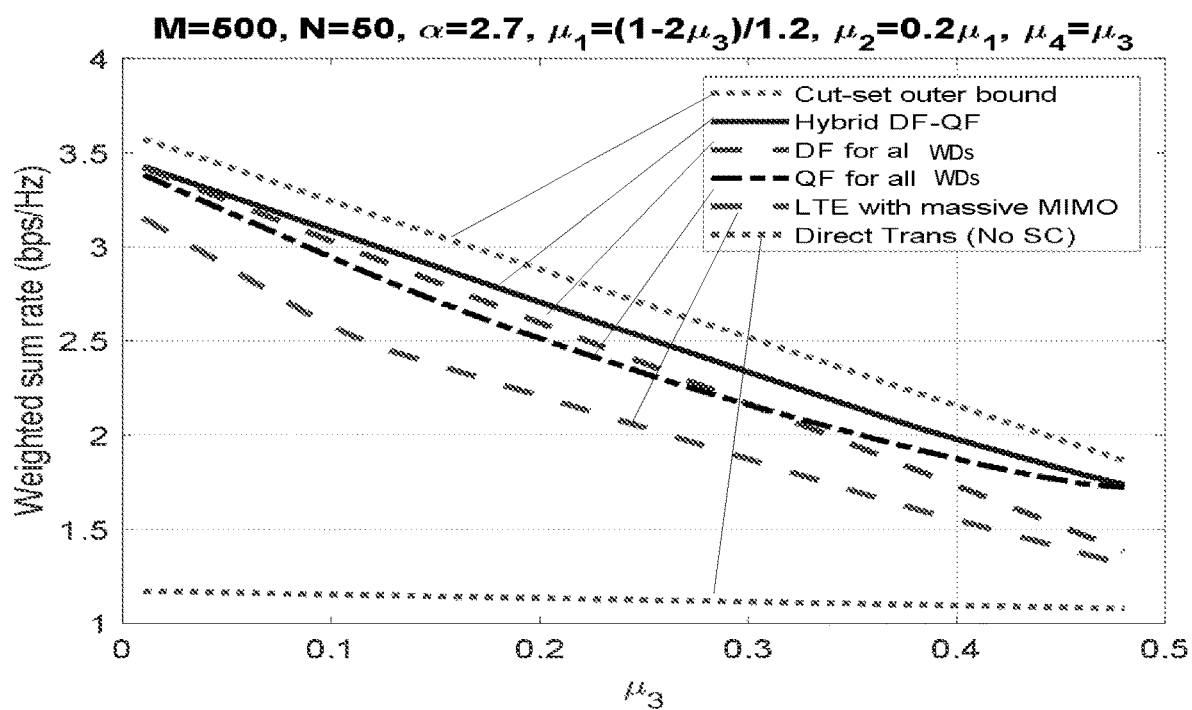
FIG. 8 is a graph of performance of different schemes for DF and QF.

The results in FIG. 8 are based on an example of 4-WD uplink transmission using massive MIMO HetNet as illustrated in FIG. 3 with the following settings: P1=P2 while Pr=5P1. In this example, the SCBS 10 has 50 antennas and the MCBS 12 has 500 antennas. The inter-node distances in meters are: $d_{d1}=d_{d2}=105$; $d_{d3}=d_{d2}=110$; $d_{dr}=100$; $d_{r1}=20$; $d_{r2}=25$; $d_{r1}=45$; and $d_{r4}=40$. The path loss fading is determined by a path loss exponent $\alpha=2.7$. The SNR=1 dB where SNR is defined as:

$$SNR = 10 \log(P_1(M-N)d_{d1}^{-\alpha})$$

The figure provides comparisons among the hybrid DF-QF scheme with the cut-set outer bound; the previous schemes of DF-only and QF-only relaying; the LTE standard with massive MIMO, and the direct transmission without the SCBS 10. For the hybrid scheme, the SCBS 10 deploys DF relaying for a first two WDs 8 and QF relaying for a second two WDs 8. Moreover, in the LTE standard, half-duplex dual-hop DF relaying is used where the SCBS 10 decodes in timeslot 1 and forwards in timeslot 2. As can be seen in FIG. 8, the hybrid DF-QF performance is greater than using DF for all WDs 8 or using QF for all WDs 8. Thus, the results show that the hybrid scheme outperforms the existing schemes and is very close to the cut-set outer bound.

Suboptimal Selection for the WDs with DF or QF Relaying

The above paragraphs discussed the transmission and optimization algorithms for the hybrid DF-QF scheme assuming an arbitrary set of WDs 8 with DF relaying at the SCBS 10 and another set of WDs 8 with QF relaying. In practice, the SCBS 10 should determine which WDs 8 to be relayed with DF or QF relaying. A selection algorithm that requires at most K iterations is now presented based on the following two well-known results for the single relay channel:
If the link quality (e.g., SNR) from the WD 8 to the SCBS 10 is weaker than the link from the WD 8 to the MCBS 12, i.e., $SNR_{SCBS} \leq SNR_{MCBS}$, deploying QF relaying at the SCBS 10 leads to a higher rate than DF relaying.
In the opposite case, i.e., $SNR_{SCBS} > SNR_{MCBS}$, the QF relaying is preferred if $SNR_{SCBS}$ is slightly stronger than $SNR_{MCBS}$ while DF relaying is preferred when $SNR_{SCBS}$ becomes much stronger than $SNR_{MCBS}$ Based on the second point, the SCBS 10 deploys DF relaying for the WDs 8 with higher ratios of $SNR_{SCBS}/SNR_{MCBS}$ and QF relaying for the remaining WDs 8. Hence, after ordering the WDs 8 in descending order of their ratios $SNR_{SCBS}/SNR_{MCBS}$, one can determine the last WD 8

(k=K1) such that the SCBS 10 will deploy DF relaying for that WD 8 and the previous WDs 8; and QF relaying for the next WDs 8.

Corollary 1: For the hybrid DF-QF scheme for massive MIMO HetNet, the sum rate at high SNR is maximized when the SCBS 10 deploys DF relaying for WDs 8 with high $SNR_{SCBS}/SNR_{MCBS}$ and QF relaying for the WDs 8 with small $SNR_{SCBS}/SNR_{MCBS}$.

Proof: With the same number of WDs 8 in G(QF) and equal weighting factors (sum rate), the optimal $\eta_s^*$ in algorithm 2 is the same regardless of the set of WDs 8 in G(QF). Hence, it is irrelevant when comparing between the sum rates of two cases where different WDs 8 are selected for QF relaying. Considering the rate formulas in (17) and (18) and given that $1+b_k \approx b_k$ and $1+a_k \approx a_k$ at high SNR, it can be shown that it is better to deploy DF relaying for WDs 8 with high $SNR_{SCBS}/SNR_{MCBS}$ ratios.

Figure 9:
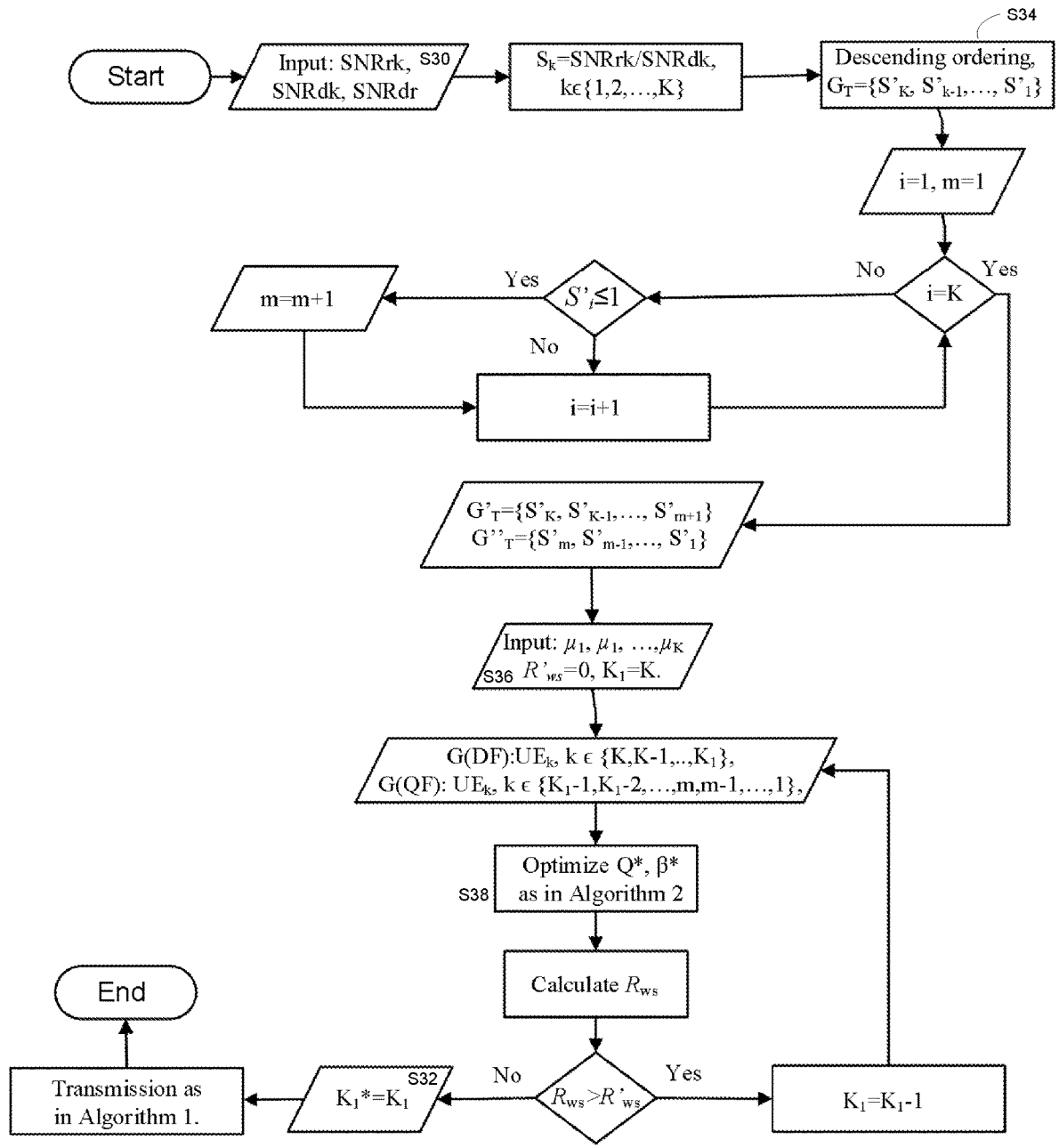
FIG. 9 is flowchart of an exemplary process for optimal selection of DF and QF.

Based on Corollary 1 and the previous results for a single relay channel, the following Algorithm 3 summarizes the flowchart shown in FIG. 9.

---

Algorithm 3: Optimal selection for WDs with DF or QF relaying in order to Maximize the weighted sum rate of the hybrid DF-QF scheme in Massive MIMO HetNet.

Input: M, N, $P_r$, $P_k$, $d_{rk}$, $d_{dk}$, $d_{d1}$, and $\mu_k$, k∈{1, 2, ..., K}. (Block S30)
Output: 1) Optimal $K_1^*$ (Block S32) that determines the WDs with DF or QF relaying as follow:
 Group of DF WDs (G(DF)): DF relaying for WDs k∈{1, 2, ..., $K_1^*$},
 Group of QF WDs (G(QF)): QF relaying for
  WDs k∈{$K_1^*$ + 1, $K_1^*$ + 2, ..., K},
 Definitions: $a_k$ = $SNR_{MCBS}$, $b_k$ = $SNR_{SCBS}$, $$a_k = P_1(M-N)/d_{d1}^\alpha, b_k = P_k N/d_{rk}^\alpha, S_k = \frac{b_k}{a_k},$$

1) For any $WD_k$ with Arrange $S_k \le 1$, the SCBS 10 deploys QF relaying for that WD, i.e.,
  $UE_k \in G(QF)$, if $S_k \le 1$.
  Assume that there are m WDs with $S_k \le 1$, where m ≤ K.
2) For the remaining K-m WDs with $S_k > 1$, first, arrange these WDs in descending order (Block S34) based on their $S_k$. Without loss of generality, assume that $S_1 \ge S_2 \ge ... \ge S_{K-m}$
3) Set $K_1$ = 1 initially, i.e., $WD_1 \in G(DF)$ and the remaining WDs ∈ G(QF). Then, for the given weighting factors $\mu_k$ (Block S36), calculate the optimal resource allocations and the corresponding weighted sum rate as in Algorithm 2. (Block S38).
4) Repeat step 3 for $K_1$ = 2, 3, ..., and K-m.
5) Select $K_1^*$ that leads to the maximum weighted sum rate.
 End

---

Thus, in summary, the uplink transmissions are carried out based on the following steps.

Determine the set of WDs that will be relayed through DF or QF relaying as in Algorithm 3.

Determine the optimal resource allocation as in Algorithm 2.

Deploy the uplink transmission as in Algorithm 1.

Figure 10:
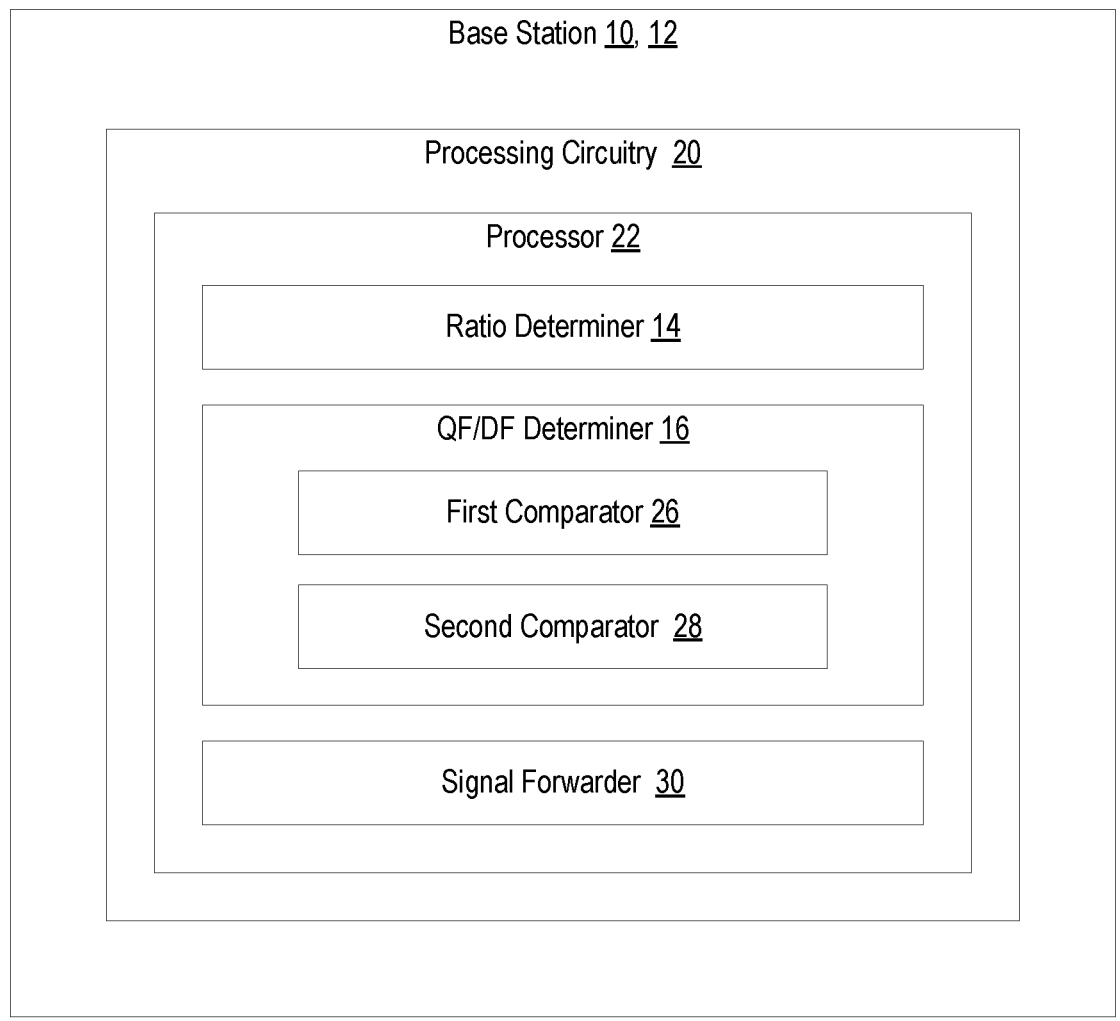
FIG. 10 is a block diagram of a base station constructed in accordance with principles set forth herein.

FIG. 10 is a block diagram of an example base station such as the SCBS 10 or MCBS 12 having processing circuitry 20 which may include a processor 22 configured to execute software instructions to perform a hybrid method for quantize-forwarding and decode-forwarding relayed signals in MIMO heterogeneous networks. The processor 22 may execute software instructions to perform functions of a ratio determiner 14 configured to receive or determine a ratio of a signal quality of a signal received from the WD at the SCBS 10 to a signal quality of a signal received from the WD 8 at the MCBS 12. A QF/DF determiner 16 includes a first comparator 26 configured to compare the ratio to a first threshold. The QF/DF determiner 16 also includes a second comparator 28 configured to compare the ratio to a second threshold. A signal forwarder 30 forwards the signal received at the SCBS 10 to the MCBS as a quantize-forward, QF, relay signal when the ratio is less than the first threshold, as a QF relay signal when the ratio is greater than the first threshold but less than the second threshold, and as a decode-forward, DF, relay signal when the ratio is greater than the second threshold.

Figure 11:
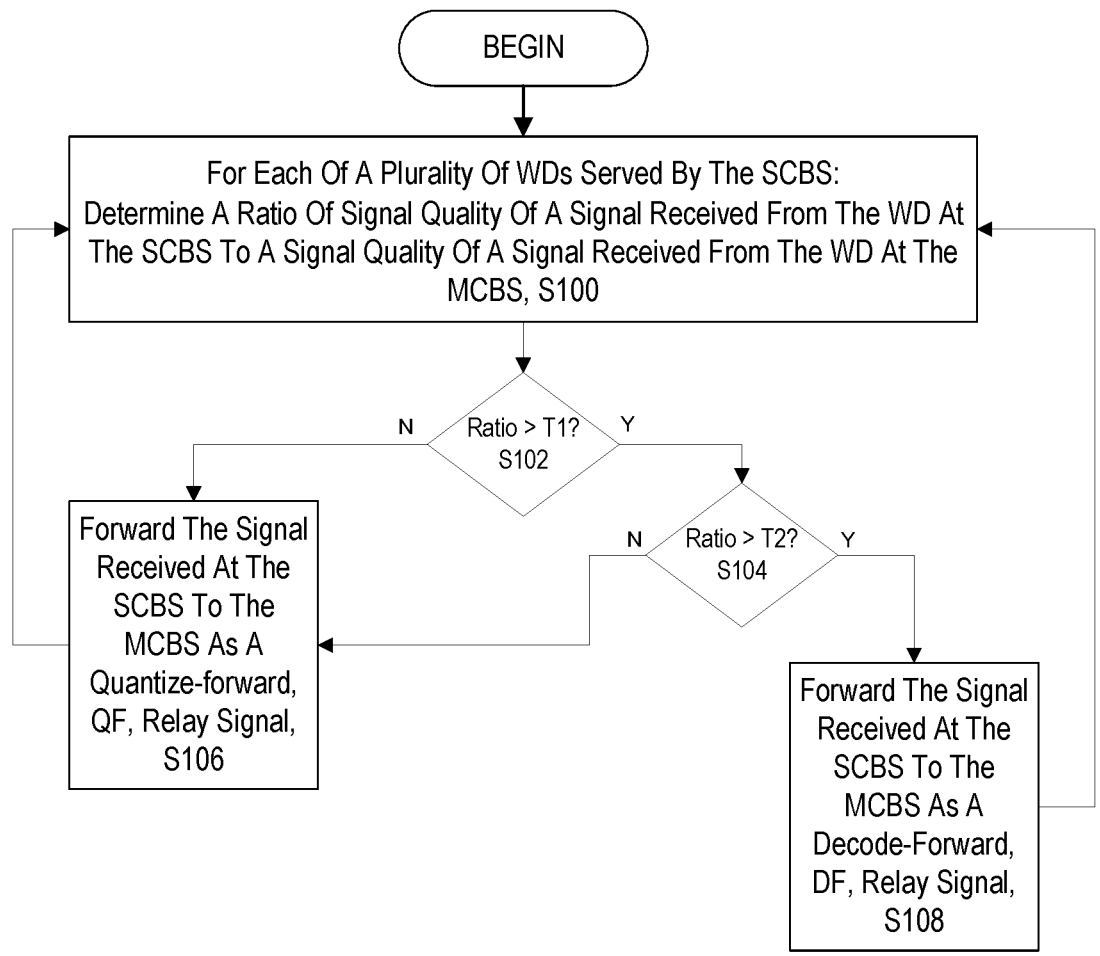
FIG. 11 is a flowchart of an exemplary process for quantize-forwarding and decode-forwarding relayed signals in MIMO heterogeneous networks.

FIG. 11 is a flowchart of an exemplary process for quantize-forwarding and decode-forwarding relayed signals in MIMO heterogeneous networks. The process includes, for each of a plurality of WDs 8 served by the SCBS 10: determining, via the ratio determiner 24, a ratio of signal quality of a signal received from the WD 8 at the SCBS 10 to a signal quality of a signal received from the WD 8 at the MCBS 12 (Block S100). The process includes comparing, via the first comparator 26, the ratio to a first threshold (Block S102). When the ratio is less than the first threshold, then the process moves to forwarding, via the signal forwarder 30, the signal received at the SCBS 10 to the MCBS 12 as a quantize-forward, QF, relay signal (Block S106). When the ratio is greater than the first threshold, then the process moves to comparing, via the second comparator 28, the ratio to a second threshold (Block S104). If the ratio is less than the second threshold, then the process moves to forwarding, via the signal forwarder 30, the signal received at the SCBS 10 to the MCBS 12 as a QF relay signal (Block S106). If the ratio is greater than the second threshold, then the process moves to forwarding, via the signal forwarder 30, the signal received at the SCBS 10 to the MCBS 12 as a decode-forward, DF, relay signal (Block S108).

Advantages of some embodiments include achievement of larger rate regions than known schemes, linear complexity scaling with the number of WDs 8, and closed form expressions for the optimal resource allocation at the SCBS 10 that maximizes the weighted sum rate.

Thus, according to one aspect, a method for processing uplink signals transmitted from a WD 8 to an SCBS 10, and from the SCBS 10 to a MCBS 12 is provided, where the MCBS 12 serves a macro cell that at least partially includes a small cell served by the SCBS 10. The method includes, for each of a plurality of WDs 8 served by the SCBS 10, determining a ratio of signal quality of a signal received from the WD 8 at the SCBS 10 to a signal quality of a signal received from the WD 8 at the MCBS 12 (Block S100). The method includes comparing the determined ratio to a first threshold (Block S102). When the ratio is less than the first threshold, the signal received at the SCBS 10 is forwarded to the MCBS 12 as a quantize-forward, QF, relay signal (Block S106). When the determined ratio is greater than the first threshold, the ratio is compared to a second threshold greater than the first threshold (Block S104). If the determined ratio is greater than the second threshold then the signal received at the SCBS 10 is forwarded to the MCBS 12 as a decode-forward, DF, relay signal (Block S108). Otherwise, the signal received at the SCBS 10 is forwarded to the MCBS 12 as a QF relay signal (Block S106). The DF relay signal may be based at least in part on a decoding of the signal received at the SCBS 10. The QF relay signal may be based at least in part on a quantization of the signal received at the SCBS 10.

According to this aspect, in some embodiments, the second threshold is determined based at least in part on a linear threshold search of no more than K iterations, where K is the number of the plurality of WDs 8 served by the SCBS 10. In some embodiments, the second threshold is determined such that a number of WDs 8 selected for DF relaying results in a maximum weighted sum rate of signals relayed from the SCBS 10 to the MCBS 12. In some embodiments, the method further includes determining a quantization for each WD 8 signal forwarded by QF relaying, the quantization being determined by a water-filling algorithm. In some embodiments, the method further includes determining a phase duration for each forwarded WD 8 signal, the phase duration being determined by the water-filling algorithm. In some embodiments, the water-filling algorithm includes: prioritizing the WDs 8 based on weighting factors and on the determined ratio for each WD 8; determining a maximum transmit rate for each WD 8 in order of priority; and determining phases of the WDs 8 as a function of their maximum transmit rates. In some embodiments, the forwarding is by a transmission process that includes binning the WD 8 signals and transmitting binning indices that include quantization indices of QF relay signals and/or that correspond to decoded messages of the DF relay signals. In some embodiments, the transmission process includes applying separate sequential sliding window decoding over two sequential transmission blocks received at the MCBS 12. In some embodiments, the decoding at the MCBS 12 includes decoding a signal from an nth WD 8 sent in a first of the two transmission blocks by applying zero-forcing detection to separate data streams of the WDs 8 and data streams of the SCBS 10. In some embodiments, the decoding at the MCBS 12 further includes decoding a bin index of the nth WD 8 signal in the second transmission block using an nth phase and further decoding a message of the nth WD 8 signal based on the bin index.

According to another aspect, a network node 10, 12 processes uplink signals from a wireless device, WD 8, to an SCBS 10, and from the SCBS 10 to a MCBS 12, where the MCBS 12 serves a macro cell that at least partially includes a small cell served by the SCBS 10. The network node includes processing circuitry 20 configured to, for each of a plurality of WDs 8 served by the SCBS 10: obtain a ratio of signal quality of a signal received from the WD 8 at the SCBS 10 to signal quality of a signal received from the WD 8 at the MCBS 12. The processing circuitry 20 is further configured to compare the determined ratio to a first threshold. When the ratio is less than the first threshold, the signal received at the SCBS 10 is forwarded to the MCBS 12 as a quantize-forward, QF, relay signal. When the ratio is greater than the first threshold, the determined ratio is compared to a second threshold greater than the first threshold. If the determined ratio is greater than the second threshold, the signal received at the SCBS 10 is forwarded to the MCBS 12 as a decode-forward, DF, relay signal. Otherwise, the signal received at the SCBS 10 is forwarded to the MCBS 12 as a QF relay signal.

According to this aspect, in some embodiments, the second threshold is determined based on a linear threshold search of no more than K iterations, where K is the number of the plurality of WDs 8 served by the SCBS 10. In some embodiments, the second threshold is determined such that a number of WDs 8 selected for DF relaying results in a maximum weighted sum rate of signals relayed from the SCBS 10 to the MCBS 12. In some embodiments, the processing circuitry is further configured to determine a quantization for each WD 8 signal forwarded by QF relaying, the quantization being determined by a water-filling algorithm. In some embodiments, the processing circuitry is further configured to determine a phase duration for each forwarded WD 8 signal, the phase duration being determined by the water-filling algorithm. In some embodiments, the water-filling algorithm includes: prioritizing the WDs 8 based on weighting factors and on the determined ratio for each WD 8; determining a maximum transmit rate for each WD 8 in order of priority; and determining phases of the WDs 8 as a function of their maximum transmit rates. In some embodiments, the forwarding is by a transmission scheme that includes binning the WD signals and transmitting binning indices that include quantization indices of QF relay signals and/or that correspond to decoded messages of the DF relay signals. In some embodiments, the transmission scheme includes applying separate sequential sliding window decoding over two sequential transmission blocks at the MCBS 12. In some embodiments, the decoding at the MCBS 12 includes decoding a signal from an nth WD 8 sent in a first of the two transmission blocks by applying zero-forcing detection to separate data streams of the WDs 8 and data streams of the SCBS 10. In some embodiments, the decoding at the MCBS 12 further includes decoding a bin index of the nth WD 8 signal in the second transmission block using an nth phase and further decoding a message of the nth WD 8 signal based on the bin index.

According to yet another aspect, a processor 20 for processing uplink signals from a wireless device, WD 8, to a small cell base station, SCBS 10, and from the SCBS 10 to a macro cell base station, MCBS 12, the MCBS 12 serving a macro cell that at least partially includes a small cell served by the SCBS 10 is provided. The processor 20 includes a ratio determiner 24 configured to receive or determine a ratio of a signal quality of a signal received from the WD 8 at the SCBS 10 to a signal quality of a signal received from the WD 8 at the MCBS 12. The processor 20 further includes a first comparator 26 configured to compare the ratio to a first threshold. The processor 20 also includes a second comparator 28 configured to compare the ratio to a second threshold. A signal forwarder 30 configured to forward the signal received at the SCBS 10 to the MCBS 12 as a quantize-forward, QF, relay signal when the ratio is less than the first threshold, as a QF relay signal when the ratio is greater than the first threshold but less than the second threshold, and as a decode-forward, DF, relay signal when the ratio is greater than the second threshold.

According to this aspect, in some embodiments, the second threshold is determined based on a linear threshold search of no more than K iterations, where K is a number of a plurality of WDs 8 served by the SCBS 10. In some embodiments, the second threshold is determined such that a number of WDs 8 selected for DF relaying results in a maximum weighted sum rate of signals relayed from the SCBS 10 to the MCBS 12. In some embodiments, the processor further includes a quantizer configured to determine a quantization for each WD 8 signal forwarded by QF relaying, the quantization being determined by the quantizer using a water-filling algorithm. In some embodiments, the processor further includes a phase duration determiner to determine a phase duration for each forwarded WD 8 signal, the phase duration being determined by the phase duration determiner using the water-filling algorithm. In some embodiments, the water-filling algorithm includes: prioritizing the WDs 8 based on weighting factors and on the determined ratio for each WD 8; determining a maximum transmit rate for each WD 8 in order of priority; and determining phases of the WDs 8 as a function of their maximum transmit rates. In some embodiments, the forwarding is by a transmission scheme that includes binning the WD signals and transmitting binning indices that include quantization indices of QF relay signals and/or that correspond to decoded messages of the DF relay signals. In some embodiments, the transmission scheme includes applying separate sequential sliding window decoding over two sequential transmission blocks at the MCBS 12. In some embodiments, the decoding at the MCBS 12 includes decoding a signal from an nth WD 8 sent in a first of the two transmission blocks by applying zero-forcing detection to separate data streams of the WDs 8 and data streams of the SCBS 10. In some embodiments, the decoding at the MCBS 12 further includes decoding a bin index of the nth WD signal in the second transmission block using an nth phase and further decoding a message of the nth WD signal based on the bin index.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for processing uplink signals transmitted from a wireless device, WD, to a small cell base station, SCBS, and from the SCBS to a macro cell base station, MCBS, the MCBS serving a macro cell that at least partially includes a small cell served by the SCBS, the method comprising:
for each of a plurality of WDs served by the SCBS:
determining a ratio of signal quality of a signal received from the WD at the SCBS to a signal quality of a signal received from the WD at the MCBS;
comparing the determined ratio to a first threshold; and
when the ratio is less than the first threshold, forwarding the signal received at the SCBS to the MCBS as a quantize-forward, QF, relay signal;
when the determined ratio is greater than the first threshold, comparing the determined ratio to a second threshold greater than the first threshold, and if the determined ratio is greater than the second threshold, forwarding the signal received at the SCBS to the MCBS as a decode-forward, DF, relay signal; and
otherwise, forwarding the signal received at the SCBS to the MCBS as a QF relay signal.

2. The method of claim 1, wherein the second threshold is determined based at least in part on a linear threshold search of no more than K iterations, where K is the number of the plurality of WDs served by the SCBS.

3. The method of claim 1, wherein the second threshold is determined such that a number of WDs selected for DF relaying results in a maximum weighted sum rate of signals relayed from the SCBS to the MCBS.

4. The method of claim 1, further comprising determining a quantization for each WD signal forwarded by QF relaying, the quantization being determined by a water-filling algorithm.

5. The method of claim 4, further comprising determining a phase duration for each forwarded WD signal, the phase duration being determined by the water-filling algorithm.

6. The method of claim 4, wherein the water-filling algorithm includes:
prioritizing the WDs based at least in part on weighting factors and on the determined ratio for each WD;
determining a maximum transmit rate for each WD in order of priority; and
determining phases of the WDs as a function of their maximum transmit rates.

7. The method of claim 1, wherein the forwarding is by a transmission process that includes binning the WD signals and transmitting binning indices that at least one of:
include quantization indices of QF relay signals; and
that correspond to decoded messages of the DF relay signals.

8. The method of claim 7, wherein the transmission process includes applying separate sequential sliding window decoding over two sequential transmission blocks received at the MCBS.

9. The method of claim 8, wherein the decoding at the MCBS includes decoding a signal from an nth WD sent in a first of the two transmission blocks by applying zero-forcing detection to separate data streams of the WDs and data streams of the SCBS.

10. The method of claim 8, wherein the decoding at the MCBS further includes decoding a bin index of the nth WD signal in the second transmission block using an nth phase and further decoding a message of the nth WD signal based at least in part on the bin index.

11. A network node for processing uplink signals from a wireless device, WD, to a small cell base station, SCBS, and from the SCBS to a macro cell base station, MCBS, the MCBS serving a macro cell that at least partially includes a small cell served by the SCBS, the network node including processing circuitry configured to:
for each of a plurality of WDs served by the SCBS:
determine a ratio of signal quality of a signal received from the WD at the SCBS to signal quality of a signal received from the WD at the MCBS;
compare the determined ratio to a first threshold; and
when the ratio is less than the first threshold, forward the signal received at the SCBS to the MCBS as a quantize-forward, QF, relay signal;
when the ratio is greater than the first threshold, compare the determined ratio to a second threshold greater than the first threshold and if the determined ratio is greater than the second threshold, forward the signal received at the SCBS to the MCBS as a decode-forward, DF, relay signal; and
otherwise, forward the signal received at the SCBS to the MCBS as a QF relay signal.

12. The network node of claim 11, wherein the second threshold is determined based at least in part on a linear threshold search of no more than K iterations, where K is the number of the plurality of WDs served by the SCBS.

13. The network node of claim 11, wherein the second threshold is determined such that a number of WDs selected for DF relaying results in a maximum weighted sum rate of signals relayed from the SCBS to the MCBS.

14. The network node of claim 11, wherein the processing circuitry is further configured to determine a quantization for each WD signal forwarded by QF relaying, the quantization being determined by a water-filling algorithm.

15. The network node of claim 14, wherein the processing circuitry is further configured to determine a phase duration for each forwarded WD signal, the phase duration being determined by the water-filling algorithm.

16. The network node of claim 14, wherein the water-filling algorithm includes:
prioritizing the WDs based at least in part on weighting factors and on the determined ratio for each WD;
determining a maximum transmit rate for each WD in order of priority; and
determining phases of the WDs as a function of their maximum transmit rates.

17. The network node of claim 11, wherein the forwarding is by a transmission scheme that includes binning the WD signals and transmitting binning indices that at least one of:
include quantization indices of QF relay signals; and
that correspond to decoded messages of the DF relay signals.

18. The network node of claim 17, wherein the transmission scheme includes applying separate sequential sliding window decoding over two sequential transmission blocks at the MCBS.

19. The network node of claim 18, wherein the decoding at the MCBS includes decoding a signal from an nth WD sent in a first of the two transmission blocks by applying zero-forcing detection to separate data streams of the WDs and data streams of the SCBS.

20. The network node of claim 18, wherein the decoding at the MCBS further includes decoding a bin index of the nth WD signal in the second transmission block using an nth phase and further decoding a message of the nth WD signal based at least in part on the bin index.

21. A processor for processing uplink signals from a wireless device, WD, to a small cell base station, SCBS, and from the SCBS to a macro cell base station, MCBS, the MCBS serving a macro cell that at least partially includes a small cell served by the SCBS, the processor comprising:
a ratio determiner configured to receive or determine a ratio of a signal quality of a signal received from the WD at the SCBS to a signal quality of a signal received from the WD at the MCBS;
a first comparator configured to compare the ratio to a first threshold;
a second comparator configured to compare the ratio to a second threshold; and
a signal forwarder configured to forward the signal received at the SCBS to the MCBS as a quantize-forward, QF, relay signal when the ratio is less than the first threshold, as a QF relay signal when the ratio is greater than the first threshold but less than the second threshold, and as a decode-forward, DF, relay signal when the ratio is greater than the second threshold.

22. The processor of claim 21, wherein the second threshold is determined based at least in part on a linear threshold search of no more than K iterations, where K is a number of a plurality of WDs served by the SCBS.

23. The processor of claim 21, wherein the second threshold is determined such that a number of WDs selected for DF relaying results in a maximum weighted sum rate of signals relayed from the SCBS to the MCBS.

24. The processor of claim 21, further comprising a quantizer configured to determine a quantization for each WD signal forwarded by QF relaying, the quantization being determined by the quantizer using a water-filling algorithm.

25. The processor of claim 24, further comprising a phase duration determiner to determine a phase duration for each forwarded WD signal, the phase duration being determined by the phase duration determiner using the water-filling algorithm.

26. The processor of claim 24, wherein the water-filling algorithm includes:
   prioritizing the WDs based at least in part on weighting factors and on the determined ratio for each WD;
   determining a maximum transmit rate for each WD in order of priority; and
   determining phases of the WDs as a function of their maximum transmit rates.

27. The processor of claim 21, wherein the forwarding is by a transmission scheme that includes binning the WD signals and transmitting binning indices that at least one of:
   include quantization indices of QF relay signals; and
   that correspond to decoded messages of the DF relay signals.

28. The processor of claim 27, wherein the transmission scheme includes applying separate sequential sliding window decoding over two sequential transmission blocks at the MCBS.

29. The processor of claim 28, wherein the decoding at the MCBS includes decoding a signal from an nth WD sent in a first of the two transmission blocks by applying zero-forcing detection to separate data streams of the WDs and data streams of the SCBS.

30. The processor of claim 28, wherein the decoding at the MCBS further includes decoding a bin index of the nth WD signal in the second transmission block using an nth phase and further decoding a message of the nth WD signal based at least in part on the bin index.

* * * * *